(12) United States Patent
Yamada et al.

(10) Patent No.: US 11,172,170 B2
(45) Date of Patent: Nov. 9, 2021

(54) IMAGE RECORDING APPARATUS, IMAGE RECORDING METHOD, AND IMAGE RECORDING PROGRAM

(71) Applicant: JVC KENWOOD Corporation, Yokohama (JP)

(72) Inventors: Yasuo Yamada, Yokohama (JP); Toshitaka Murata, Yokohama (JP); Keita Hayashi, Yokohama (JP)

(73) Assignee: JVC KENWOOD CORPORATION, Yokohama (JP)

( * ) Notice: Subject to any disclaimer, the term of this patent is extended or adjusted under 35 U.S.C. 154(b) by 141 days.

(21) Appl. No.: 16/373,485

(22) Filed: Apr. 2, 2019

(65) Prior Publication Data

US 2019/0230325 A1    Jul. 25, 2019

Related U.S. Application Data

(63) Continuation of application No. PCT/JP2018/019067, filed on May 17, 2018.

(30) Foreign Application Priority Data

| Jul. 31, 2017 | (JP) | .............................. JP2017-147937 |
| Jul. 31, 2017 | (JP) | .............................. JP2017-147938 |
| Jul. 31, 2017 | (JP) | .............................. JP2017-147940 |

(51) Int. Cl.
*H04N 7/18* (2006.01)
*G06T 7/70* (2017.01)
(Continued)

(52) U.S. Cl.
CPC ......... *H04N 7/188* (2013.01); *G06K 9/00805* (2013.01); *G06K 9/325* (2013.01);
(Continued)

(58) Field of Classification Search
None
See application file for complete search history.

(56) References Cited

U.S. PATENT DOCUMENTS

| 2011/0057783 | A1* | 3/2011 | Yagi | ................... | H04N 5/23206 340/436 |
| 2019/0012908 | A1* | 1/2019 | Chun | ................... | G08G 1/0125 |

FOREIGN PATENT DOCUMENTS

| JP | 5064257 B | * | 9/1993 |
| JP | 2000-006854 A | | 1/2000 |

(Continued)

*Primary Examiner* — Kaitlin A Retallick
(74) *Attorney, Agent, or Firm* — Procopio, Cory, Hargreaves & Savitch LLP

(57) ABSTRACT

An image recording apparatus according to the present invention includes an image-data acquiring unit that sequentially acquires image data obtained by imaging a periphery of a vehicle, an event-signal acquiring unit that acquires an event signal indicating occurrence of a predetermined event to the vehicle, a condition detecting unit that detects, when the event-signal acquiring unit acquires the event signal, whether a positional relation of another vehicle with the vehicle satisfies a predetermined condition, and a writing controller that writes the image data in a memory in a ring buffer format, or writes, when the event-signal acquiring unit acquires the event signal, the image data including a period from when the event signal has been acquired until the condition detecting unit has detected that the condition is satisfied in the memory so that the image data is not overwritten.

16 Claims, 24 Drawing Sheets

(51) Int. Cl.
*G06K 9/00* (2006.01)
*H04N 5/232* (2006.01)
*G08G 1/00* (2006.01)
*G06K 9/32* (2006.01)
*G07C 5/00* (2006.01)

(52) U.S. Cl.
CPC .............. *G06T 7/70* (2017.01); *G07C 5/00* (2013.01); *G08G 1/00* (2013.01); *H04N 5/23218* (2018.08); *H04N 7/18* (2013.01)

(56) References Cited

FOREIGN PATENT DOCUMENTS

| | | | |
|---|---|---|---|
| JP | 2008-242725 | A | 10/2008 |
| JP | 2008-271016 | A | 11/2008 |
| JP | 2009-265787 | A | 11/2009 |
| JP | 2011028651 | A | 2/2011 |
| JP | 2012-53564 | A | 3/2012 |
| JP | 5064257 | B2 | 10/2012 |
| JP | 2016-58867 | A | 4/2016 |

\* cited by examiner

IMAGE RECORDING APPARATUS, IMAGE RECORDING METHOD, AND IMAGE RECORDING PROGRAM

CROSS REFERENCE TO RELATED APPLICATION

This application is a bypass continuation of International Application No. PCT/JP2018/019067, filed on May 17, 2018, which is based upon and claims the benefit of priority of Japanese Patent Application Nos. 2017-147938 filed on Jul. 31, 2017, 2017-147937 filed on Jul. 31, 2017, and 2017-147940 filed on Jul. 31, 2017, the disclosures of which are incorporated herein in its entirety by reference.

BACKGROUND

The present invention relates to an image recording apparatus, an image recording method, and an image recording program.

Ordinary drive recorders move, when an event, such as an impact, is detected, image data for a predetermined time including the detection time of the event to memory areas where the data is not overwritten (for example, see Japanese Unexamined Patent Application Publication No. 2000-6854).

SUMMARY

A conventional drive recorder in which recording of overwriting-prohibition moving images is limited for a predetermined time including an event detection time has been insufficient from the viewpoint of recording the state of a target after the event occurrence. In the case of, for example, a collision, a target vehicle has already collided with a vehicle at the detection time, and only a part of the target vehicle usually appears in the image imaged at this time. The information obtained from the image is insufficient to identify the target vehicle.

An image recording apparatus according to a first aspect of the present invention includes an image-data acquiring unit that sequentially acquires image data obtained by imaging a periphery of a vehicle, an event-signal acquiring unit that acquires an event signal indicating occurrence of a predetermined event to the vehicle, a condition detecting unit that detects, when the event-signal acquiring unit acquires the event signal, whether a positional relation of a target with the vehicle satisfies a predetermined condition, and a writing controller that writes, when the event-signal acquiring unit does not acquire the event signal, the image data in a memory in a ring buffer format, or writes, when the event-signal acquiring unit acquires the event signal, the image data including a period from when the event signal has been acquired until the condition detecting unit has detected that the condition is satisfied in the memory such that the image data is not overwritten.

An image recording method in a second aspect of the present invention includes an image-data acquiring step of sequentially acquiring image data obtained by imaging a periphery of a vehicle, an event-signal acquiring step of acquiring an event signal indicating occurrence of a predetermined event to the vehicle, a condition detecting step of detecting, when the event signal is acquired in the event-signal acquiring step, whether a predetermined condition is satisfied by changing a positional relation of a target with the vehicle, and a writing controlling step of writing, when the event signal is not acquired in the event-signal acquiring step, the image data in a memory in a ring buffer format, or of writing, when the event signal is acquired in the event-signal acquiring step, the image data including a period from when the event signal has been acquired until the condition has been detected to be satisfied in the condition detecting step in the memory such that the image data is not overwritten.

A non-transitory computer readable medium storing an image recording program causing a computer to execute: an image-data acquiring step of sequentially acquiring image data obtained by imaging a periphery of a vehicle, an event-signal acquiring step of acquiring an event signal indicating occurrence of a predetermined event to the vehicle, a condition detecting step of detecting, when the event signal is acquired in the event-signal acquiring step, whether a predetermined condition is satisfied by changing a positional relation of a target with the vehicle, and a writing controlling step of writing, when the event signal is not acquired in the event-signal acquiring step, the image data in a memory in a ring buffer format, or of writing, when the event signal is acquired in the event-signal acquiring step, the image data including a period from when the event signal has been acquired until the condition has been detected to be satisfied in the condition detecting step in the memory such that the image data is not overwritten.

DETAILED DESCRIPTION

Hereinafter, the present invention is described with embodiments, but the invention in the scope of Claims is not limited to the following embodiments. In addition, all the configurations to be described in the embodiments are not essential to a means for solving problems.

In addition, a plurality of embodiments to be described below may be implemented independently or in appropriate combination. The embodiments have different novel features. Thus, the embodiments contribute to attainment of different objects or to a solution to different problems and have different effects.

First Embodiment

Figure 1:
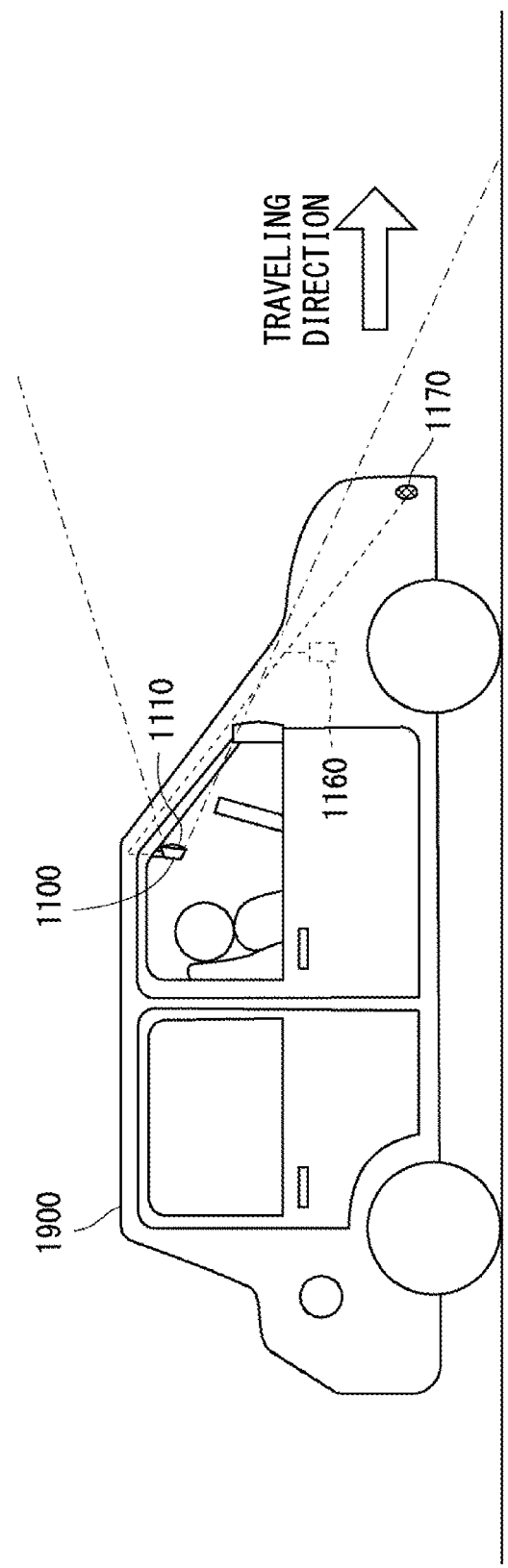
FIG. 1 is a schematic diagram shown that a drive recorder according to a first to third embodiments is installed in a vehicle.

FIG. 1 is a schematic diagram showing that a drive recorder 1100, which is an example of an image recording apparatus according to a first to third embodiments, is installed in a vehicle 1900. The drive recorder 1100 includes a camera unit 1110. The camera unit 1110 is installed at the upper part of the windshield so as to face the travelling direction of the vehicle 1900 in order to image the front peripheral environment. Note that, the camera unit 1110 has, for example, a diagonal viewing angle of about 130° as indicated by the dashed dotted lines.

The vehicle 1900 includes, at its front, a plurality of distance sensors 1170 that detects a distance to another vehicle, a pedestrian, or the like. The distance sensors 1170 are, for example, millimeter-wave radars or ultrasonic sensors and output distance signals as detection results to the drive recorder 1100. The distance sensors 1170 may be incorporated in the drive recorder 1100. The vehicle 1900 further includes an acceleration sensor 1160 that detects acceleration such as an impact received by the vehicle 1900. The acceleration sensor 1160 outputs an acceleration signal as a detection result to the drive recorder 1100. The acceleration sensor 1160 may be incorporated in the drive recorder 1100.

Figure 2:
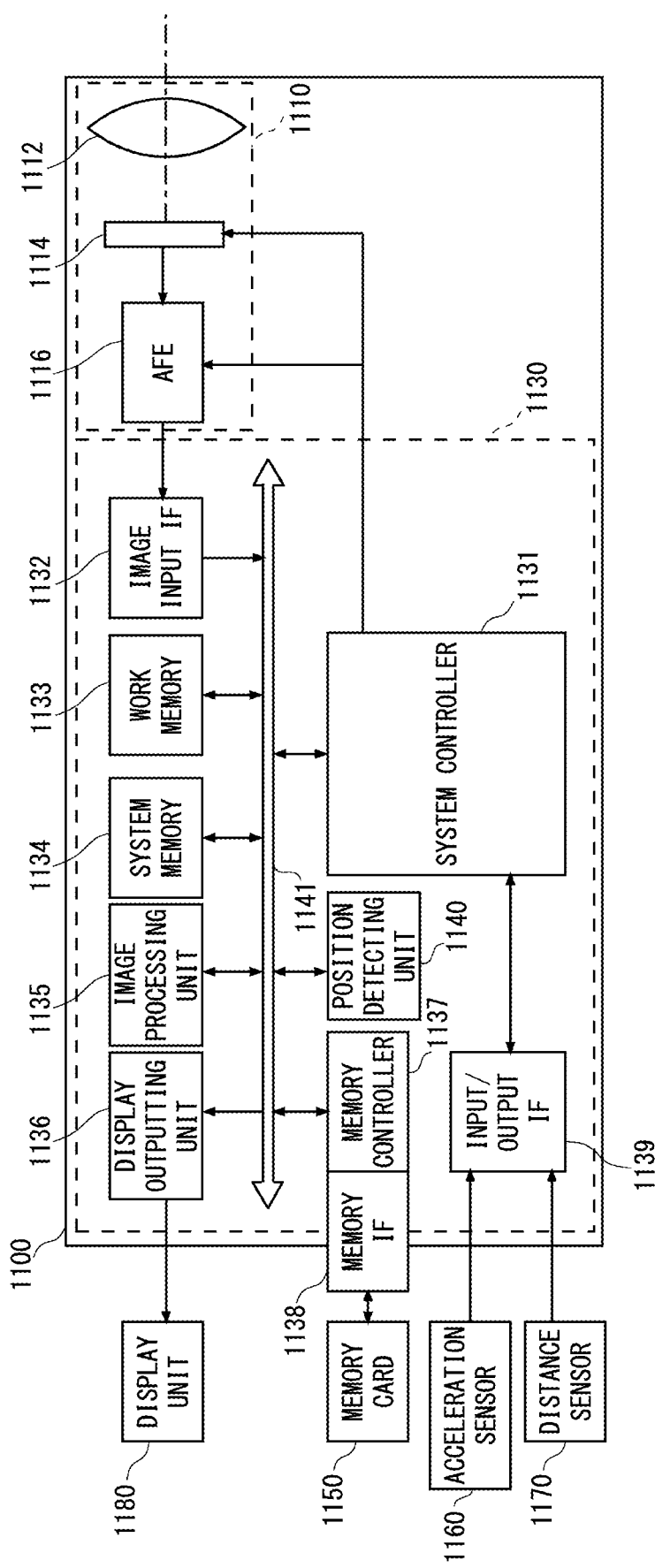
FIG. 2 is a block diagram showing a configuration of the drive recorder according to the first embodiment.

FIG. 2 is a block diagram showing a configuration of the drive recorder 1100. The drive recorder 1100 mainly includes the camera unit 1110 and a main body unit 1130.

The camera unit 1110 mainly includes a lens 1112, an image sensor 1114, and an analog front end (AFE) 1116. The lens 1112 guides incident subject luminous flux to the image sensor 1114. The lens 1112 may be constituted by a plurality of optical-lens groups.

The image sensor 1114 is, for example, a CMOS image sensor. The image sensor 1114 adjusts, according to an exposure time per frame designated by a system controller 1131, a charge storage time with an electronic shutter and performs photoelectric conversion to output a pixel signal. The image sensor 1114 transfers the pixel signal to the AFE 1116. The AFE 1116 adjusts, according to an amplification gain designated by the system controller 1131, the level of the pixel signal and performs A/D conversion into digital data to output the data to the main body unit 1130 as pixel data. Note that, the camera unit 1110 may include a mechanical shutter and an iris diaphragm. When the camera unit 1110 includes a mechanical shutter and an iris diaphragm, the system controller 1131 uses them to adjust the amount of light incident on the image sensor 1114.

The main body unit 1130 mainly includes the system controller 1131, an image input IF 1132, an work memory 1133, a system memory 1134, an image processing unit 1135, a display outputting unit 1136, a memory controller 1137, a memory IF 1138, an input/output IF 1139, a position detecting unit 1140, and a bus line 1141. The image input IF 1132 functions as an image-data acquiring unit that sequentially acquires image data obtained by the camera unit 1110 performing imaging, receives the pixel data from the camera unit 1110 connected with the main body unit 1130, and transfers the pixel data to the bus line 1141.

The work memory 1133 is, for example, a volatile high-speed memory. The work memory 1133 receives the pixel data from the AFE 1116 via the image input IF 1132 and collectively records it as image data for one frame. The work memory 1133 transfers the image data in frame units to the image processing unit 1135. In addition, the work memory 1133 is appropriately used as a temporary storage area by the image processing unit 1135 during image processing.

The image processing unit 1135 performs various kinds of image processing to the received image data to generate image data conforming to a predetermined format. In the case of generating, for example, moving image data in an MPEG file format, the image processing unit 1135 performs white balance processing, gamma processing, and the like to the image data in each frame and, then, performs compression processing of the image data in each frame and of the image data in the adjacent frames. The image processing unit 1135 sequentially generates display image data from the generated image data and transfers the display image data to the display outputting unit 1136. In the following description, image data in each frame constituting moving image data is referred to as frame image data, and an image expressed by frame image data is referred to a frame image.

The display outputting unit 1136 converts the display image data received from the image processing unit 1135 into image signals displayable on a display unit 1180 and outputs the image signals. The display unit 1180 may be, for example, a display panel of a car navigation system or a dedicated display panel provided integrally with the drive recorder 1100. The display unit 1180 is capable of sequentially displaying the image signals received from the display outputting unit 1136.

The system memory 1134 is, for example, a non-volatile recording medium such as an SSD. The system memory 1134 records and stores constants, variables, setting values, control programs, and the like necessary for the drive recorder 1100 to operate.

The memory IF 1138 is a connection interface for loading a detachable memory card 1150. The memory card 1150 is a non-volatile memory, and a flash memory is used, for example. The memory controller 1137 performs memory control for writing the image data in the memory card 1150 loaded in the memory IF 1138. That is, the memory controller 1137 functions as a writing controller that writes image data in the memory card 1150. Specific memory control is to be described later.

The input/output IF 1139 is an external-apparatus connection interface that receives a signal from an external apparatus and transfers the signal to the system controller 1131 and that receives a control signal, such as a signal request to an external apparatus, from the system controller 1131 and transmits the control signal to the external apparatus. The above acceleration signal from the acceleration sensor 1160 and the above distance signals from the distance sensors 1170 are input to the system controller 1131 via the input/output IF 1139. Thus, the input/output IF 1139 functions as an acceleration-signal acquiring unit in cooperation with the system controller 1131 when receiving an acceleration signal, and functions as a distance-signal acquiring unit in cooperation with the system controller 1131 when receiving a distance signal.

When an acceleration signal input from the acceleration sensor 1160 via the input/output IF 1139 is greater than a preset threshold, the system controller 1131 determines that an event, such as a collision, has occurred. Thus, the system controller 1131 also functions as an event-signal acquiring unit.

The system controller 1131 further determines that an approaching object has approached the vehicle 1900 from a history of the frame images received from the image processing unit 1135. Thus, the system controller 1131 also functions as an approaching-object detecting unit.

The position detecting unit 1140 receives the frame image data, to which the image processing unit 1135 has performed predetermined pre-processing, and detects whether a target subject has a predetermined positional relation in the frame image. When detecting that the target subject satisfies the predetermined positional relation in a frame image, the position detecting unit 1140 detects that the positional relation of the target subject with the vehicle 1900 satisfies a predetermined condition. Thus, the position detecting unit 1140 functions as a condition detecting unit that detects whether a positional relation of a target with the vehicle 1900 satisfies a predetermined condition.

When recognizing that the target subject has the predetermined positional relation in the frame image, the position detecting unit 1140 outputs time information about when the frame image has been imaged to the system controller 1131.

The system controller 1131 is, for example, a CPU and directly or indirectly controls the constituent elements of the drive recorder 1100. The control by the system controller 1131 is implemented by a control program or the like read from the system memory 1134.

Figure 3A:
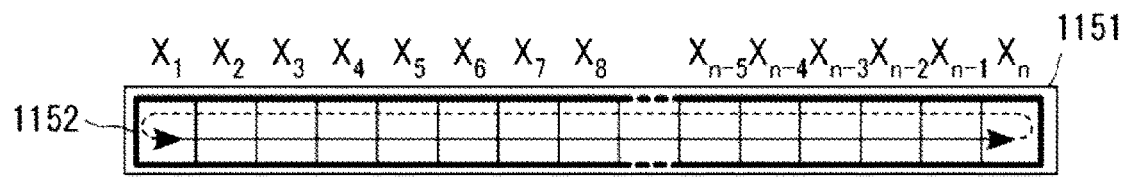
FIG. 3A is a conceptual diagram for explaining a ring buffer set in a memory card according to the first embodiment.
Figure 3B:
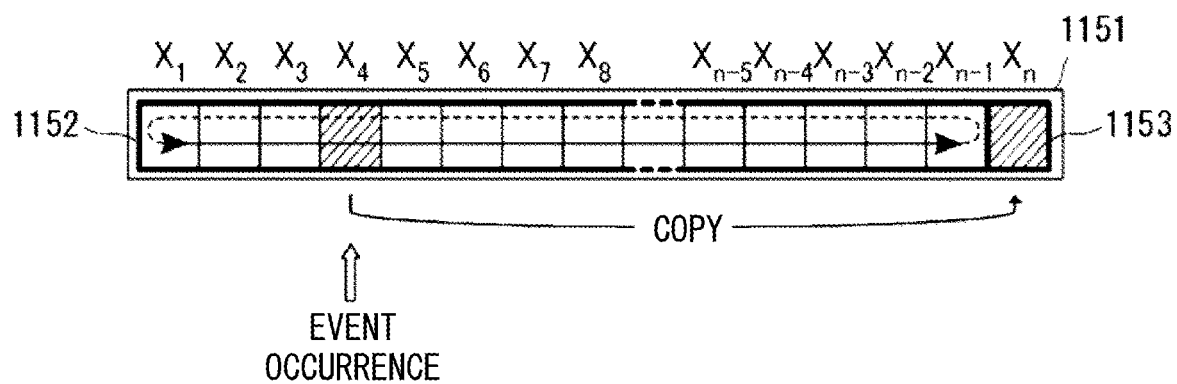
FIG. 3B is a conceptual diagram for explaining a ring buffer set in the memory card according to the first embodiment.
Figure 3C:
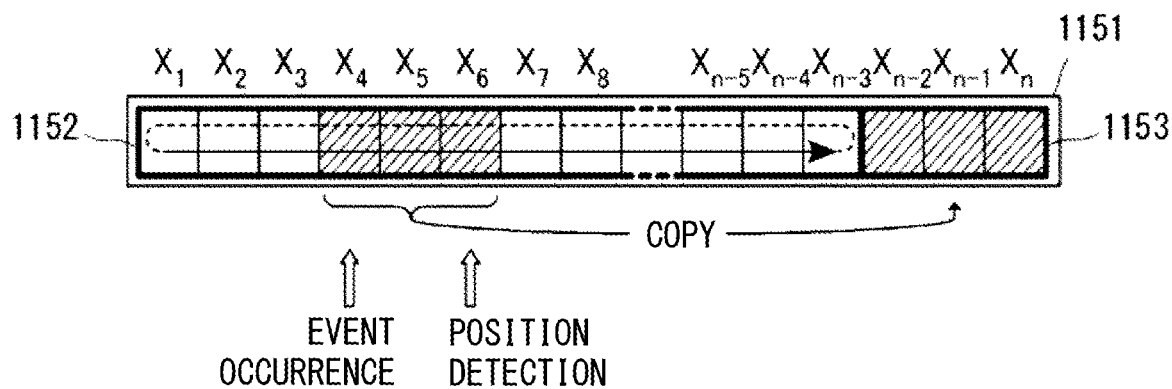
FIG. 3C is a conceptual diagram for explaining a ring buffer set in the memory card according to the first embodiment.

FIGS. 3A, 3B, and 3C are conceptual diagrams for explaining a ring buffer set in the memory card 1150. The drive recorder 1100 processes images sequentially imaged by the camera unit 1110 with the image processing unit 1135 to generate a moving image file for every minute. Then, the memory controller 1137 successively records the moving image files generated by the image processing unit 1135 in the memory card 1150 via the memory IF 1138.

The storage capacity of the memory card 1150 has the limit, and the number of moving image files to be recorded is limited. Since the drive recorder 1100 continues generating moving image files while the vehicle 1900 keeps traveling, it is impossible to record the most-newly generated moving image file in the memory card 1150 after a certain time passes. Thus, the memory controller 1137 continues recording processing in a ring buffer format in which the newest moving image file is written in the storage area storing the oldest moving image file when the storage capacity of the memory card 1150 reaches the limit.

FIG. 3A is a conceptual diagram showing that all memory areas 1151 of the memory card 1150 are used as a ring buffer 1152. When memory areas each capable of storing one moving image file are represented by X1, X2, . . . , Xn, the memory controller 1137 successively records the first moving image file in X1 and the next moving image file in X2. Then, after the n-th moving image file is recorded in Xn, the first moving image file recorded in X1 is overwritten with the n+1-th moving image file. Similarly, the moving image file recorded in X2 is overwritten with the n+2-th moving image file. By recording moving image files in the ring buffer format, it is possible to store the newest moving image files for the capacity of the ring buffer 1152.

FIG. 3B is a conceptual diagram for explaining writing control in a conventional drive recorder. The conventional drive recorder recognizes event occurrence when receiving a large acceleration signal caused by, for example, a collision with another vehicle, and copies the moving image file recording the event occurrence time in an area in which overwriting is prohibited. As shown in the drawing, when the moving image file recorded in the memory area X4 of the ring buffer 1152 includes the event occurrence time during its imaging period, the memory Xn is changed to a non-volatile buffer 1153, and the moving image file is copied in the non-volatile buffer 1153 as an event recording file. The non-volatile buffer 1153 is the area excluded from the storage area where files are recorded in the ring buffer format, in other words, the area in which overwriting is prohibited. If an event occurs a plurality of times, the memory areas Xn–1, Xn–2, and the like are successively changed to the non-volatile buffer 1153 every time an event occurs. That is, the ring buffer 1152 is reduced, as the non-volatile buffer 1153 is added. The memory area of the non-volatile buffer 1153 is used as the ring buffer 1152 again when the memory card 1150 is formatted or when a target moving image file is erased by an instruction of a user. Note that, the capacity used as the non-volatile buffer 1153 may be preset.

Conventional drive recorders have been insufficient from the viewpoint of recording the state of a target after event occurrence. As shown in FIG. 3B, overwriting of moving image data, for example, for one minute including the event occurrence time is only prohibited. In the case of a collision with another vehicle, a target vehicle has already collided with the vehicle at the detection time, and only a part of the target vehicle usually appears in the image imaged at this time. The information obtained from the image is insufficient to identify the target vehicle. In addition, in the case of an accident with a person such as a pedestrian, a target person has fallen at the event detection time, the entire image of the target person does not usually appear in the imaged image. The information obtained from the image is insufficient to record the situation of the damage.

For this reason, moving image data including a period from an event occurrence time until the position detecting unit 1140 has detected that the positional relation of a target vehicle with the vehicle 1900 satisfies a predetermined condition is written in a memory so that the moving image data is not overwritten in the present embodiment. Specifically, moving image data including a period from an event occurrence time until a target subject satisfies a predetermined positional relation in continuously imaged images is copied in the non-volatile buffer 1153. The predetermined positional relation in the present embodiment indicates a relation in which another vehicle, which is the target subject, appears with a road surface interposing between the vehicle and the target subject in the image frame. In addition, a relation in which a change in the direction of a target is detected, a relation in which a target is detected to be smaller than a predetermined size, or the like may be set as a predetermined positional relation.

FIG. 3C is a conceptual diagram for explaining writing control in the drive recorder 1100 according to the present embodiment. The methods for adding the non-volatile buffer 1153, for moving target moving image data, for recording in the ring buffer 1152, and the like are similar to those of the example in FIG. 3B, but a moving image file to be copied in the non-volatile buffer 1153 is different in the present embodiment.

It is assumed that a moving image file recorded in the memory area X4 of the ring buffer 1152 includes an event occurrence time in its imaging period similarly to the example in FIG. 3B. The camera unit 1110 continues imaging after the event, and the generated moving image files are successively written in X5, X6, and the like. The position detecting unit 1140 continuously acquires the frame image data constituting these moving image files and detects, in the frame image, whether the target subject satisfies the predetermined positional relation (position detection). Here, it is assumed that the frame image in which the position detection has occurred for the first time after the event occurrence is included in the moving image file recorded in the memory area X6. Note that, the time indicated by the time information of the frame image in which the position detection has occurred for the first time after the event occurrence is referred to as a position detection time.

In this case, the memory controller 1137 copies three moving image files of the moving image file in X4 including the event occurrence time, the moving image file in X5, and the moving image file in X6 including the position detection time in the non-volatile buffer 1153 as event recording files. That is, the memory areas from Xn–2 to Xn are changed to the non-volatile buffer 1153, and the target moving image files are copied in the non-volatile buffer 1153. If different moving image files are recorded in the non-volatile buffer 1153, the non-volatile buffer 1153 is added so as to avoid the memory areas recording the moving image files.

Figure 4A:
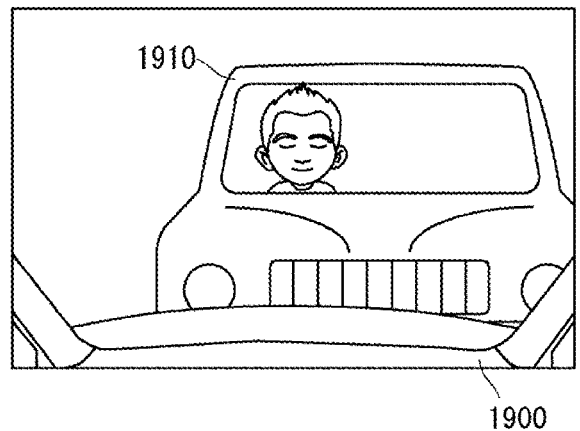
FIG. 4A is a schematic diagram showing a state immediately after an event occurs and a state in which another vehicle is separated according to the first embodiment.

When the period until the predetermined positional relation has been detected to be satisfied in the continuously imaged images is kept so that overwriting of the images are prohibited in this manner, the image data is expected to include the entire image of the target subject or the state after the accident. The present embodiment exemplifies, as an example of the predetermined positional relation in an event of a collision between vehicles, a relation in which a road surface is detected between a vehicle and the other vehicle. FIG. 4A shows the state immediately after another vehicle 1910 has collided with the vehicle 1900 (immediately after event occurrence), and FIG. 4B shows that the other vehicle 1910 is separated from the vehicle 1900 thereafter and that a road surface 1920 is detected between the vehicle 1900 and the other vehicle 1910.

When a collision as shown in FIG. 4A occurs, the system controller 1131 recognizes that an event has occurred by receiving an acceleration signal greater than a threshold caused by the collision. The image imaged at this time has the range enclosed by the outside frame of FIG. 4A. That is, the other vehicle 1910 is too close to the vehicle 1900 that the lower part thereof does not appear. Only with this image, the entire image of the other vehicle 1910 close to the vehicle 1900 at the accident time cannot be detected. Thus, it is impossible to attain an object of identifying the other vehicle 1910.

Figure 4B:
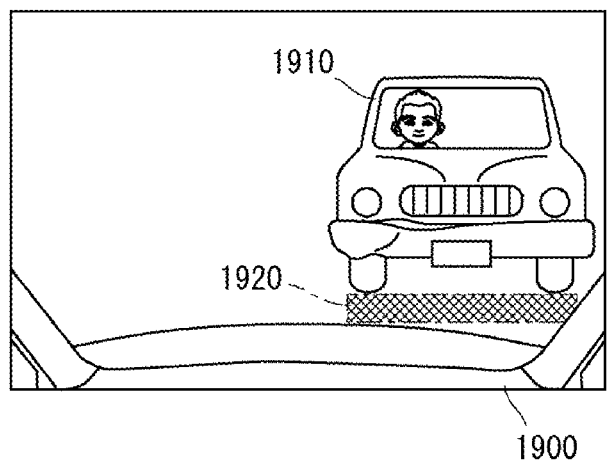
FIG. 4B is a schematic diagram showing a state immediately after the event occurs and a state in which the other vehicle is separated according to the first embodiment.

However, as long as an image including the road surface 1920 between the vehicle 1900 and the other vehicle 1910 as shown by the range enclosed by the outside frame of FIG. 4B is acquired when the vehicle 1900 is relatively separated from the other vehicle 1910 by a certain distance or more after the accident, it is possible to recognize the other vehicle 1910 as a wider range image. In addition, as long as the outline of the other vehicle 1910 is in a frame image, it is possible to grasp the entire image of the other vehicle 1910. In this manner, by recording the other vehicle 1910 as a wider range image, it is expected to further record, for example, the model of the other vehicle 1910 and its features, such as deformation or scratches. With such information, it is possible to identify the other vehicle 1910 after the accident and further attain the above object. This greatly increases the utility value of the images. For example, if the other vehicle 1910 escapes thereafter, it is easy to identify the driver. Note that, the image processing unit 1135 may generate a moving image file with the information, such as the model and color of the other vehicle 1910, embedded in the frame images or add the information to the header of the moving image file.

Figure 5:
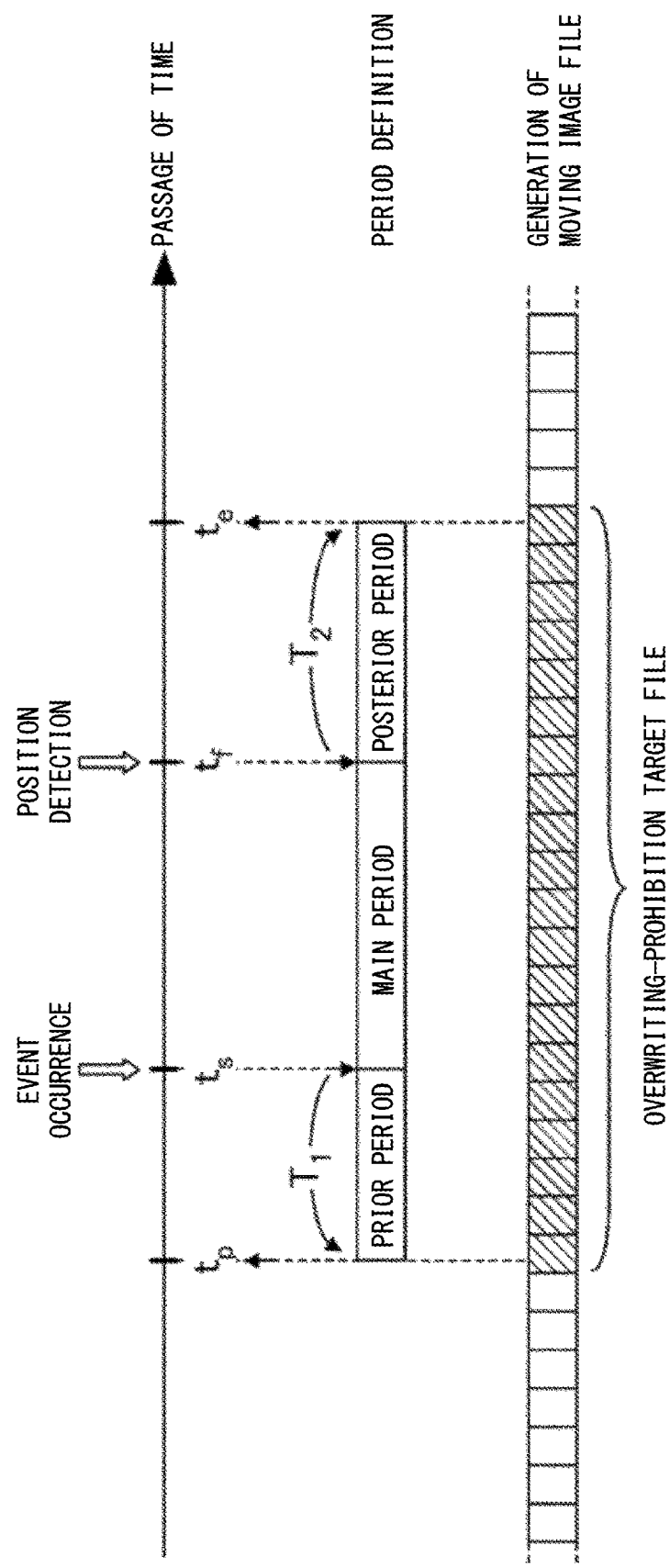
FIG. 5 is a diagram for explaining overwriting-prohibition target files over time according to the first embodiment.

As described above, when a moving image file including a period from an event occurrence time to a position detection time is recorded so that the moving image file cannot be overwritten, the utility value of the moving image file after the accident is greatly increased. Furthermore, a storage period is added in the present embodiment. FIG. 5 is a diagram for explaining overwriting-prohibition target files over time according to the present embodiment. The drawing indicates the passage of time from the left to the right.

In the drawing, it is assumed that an event occurs at a time ts and that a predetermined positional relation is detected in an image at a time tf. The period from the time ts to the time tf is set as a main period. Then, by setting a time tp going back from the time ts by a predetermined fixed time T1 as a start time and the time ts as an end time, a prior period from the start time to the end time is set before the main period. In addition, by setting the time tf as a start time and a time to after a predetermined fixed time T2 passes from the time tf as an end time, a posterior period from the start time to the end time is set after the main period.

Then, the moving image files including these three periods are set as overwriting-prohibition target files which are event recording files. That is, these moving image files are copied in the non-volatile buffer 1153. In this manner, by adding the prior and posterior periods, it is expected to widen the usage range of the images. For example, the approaching other vehicle 1910 can appear in the moving image files in the prior period, which is used to specify the cause of the accident, to confirm that the other vehicle appearing in the moving image files in the main period is the accident cause, and the like. In addition, an approaching rescuer and the escaping other vehicle 1910 can appear in the moving image files in the posterior period, which is used to identify the persons who are involved in the accident, to pursue the criminal liability, and the like.

Figure 6:
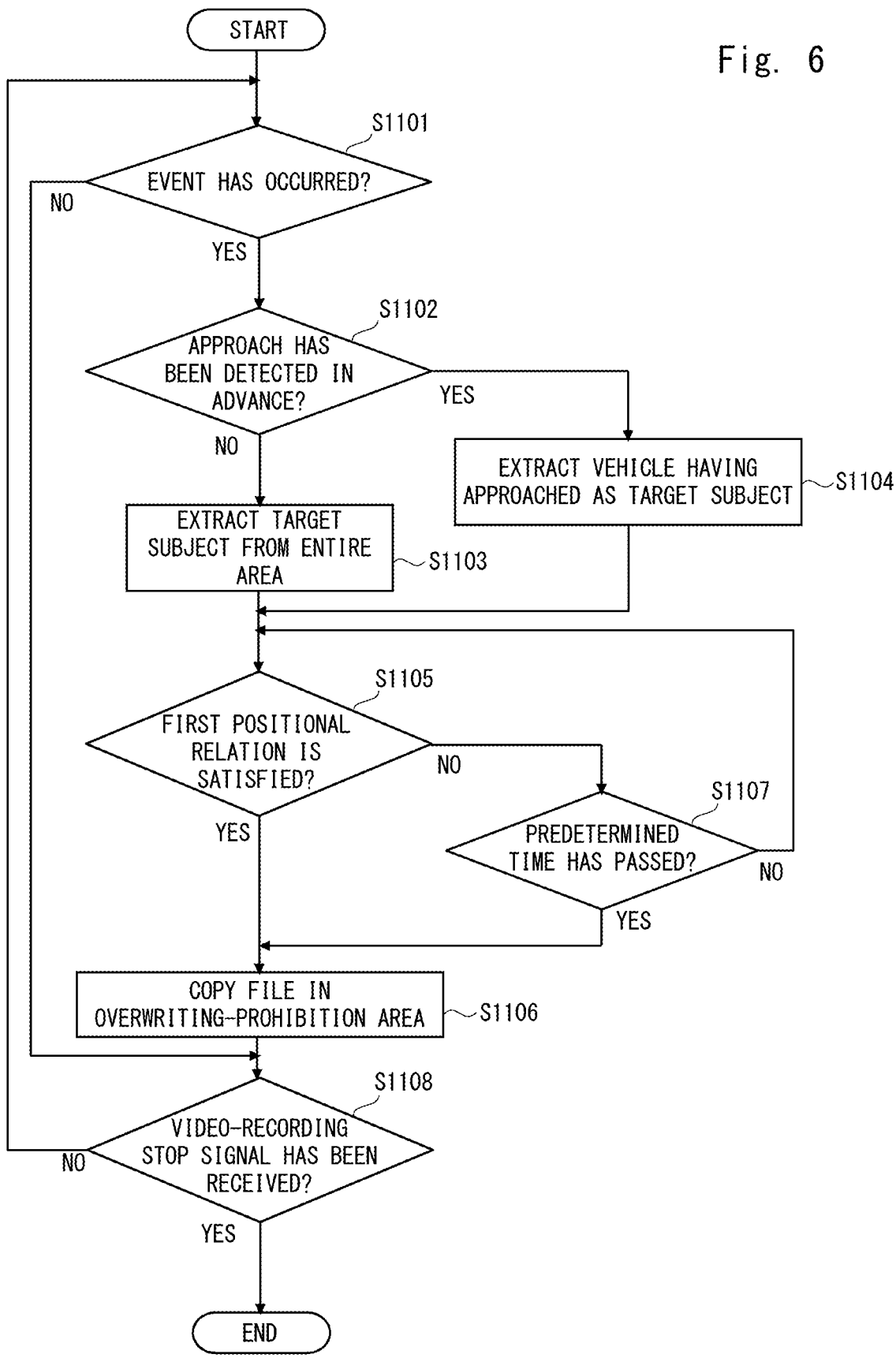
FIG. 6 is a flowchart showing a control procedure of the drive recorder according to the first embodiment.

Next, a control procedure of the drive recorder 1100 is described. FIG. 6 is a flowchart showing a control procedure of the drive recorder 1100. The procedure is started from when a traveling start preparation for the vehicle 1900 is completed. The completion of the traveling start preparation for the vehicle 1900 means, for example, starting the engine of the vehicle 1900, turning the power on, or the like. The drive recorder 1100 may operate at all times regardless of the state of the vehicle. The camera unit 1110 starts imaging as the procedure is started, and the image processing unit 1135 sequentially generates moving image files. Then, the memory controller 1137 successively records the moving image files in the memory card 1150 in the ring buffer format. The system controller 1131 monitors acceleration signals received from the acceleration sensor 1160. The following processing is performed during the control for recording the normal traveling.

The system controller 1131 determines, in step S1101, whether an acceleration signal greater than a threshold has been received from the acceleration sensor 1160, that is, whether an event has occurred. When determining that the acceleration signal greater than the threshold has been received, the system controller 1131 determines that an event has occurred and proceeds to step S1102. When determining that the acceleration signal greater than the threshold has not been received, the system controller 1131 proceeds to step S1108.

The system controller 1131 determines, in step S1102, whether a history of the frame images received from the image processing unit 1135 has captured the approach of a target. When, for example, another vehicle has been detected in a frame image before the event detection and the image of the other vehicle has become gradually larger and been the largest at the moment of the event detection, the system controller 1131 determines that the other vehicle has approached the vehicle 1900. In this manner, when determining that a series of frame images has captured the approach of the target, the system controller 1131 proceeds to step S1104 or to step S1103 otherwise.

The system controller 1131 causes, in step S1103, the position detecting unit 1140 to detect other vehicles in the entire area of each frame image in the moving image data generated after the event occurrence. Specifically, the position detecting unit 1140 stores, for example, the shape pattern of the external appearance of the vehicle to detect other vehicles by image matching. The system controller 1131 extracts the other vehicles detected by the position detecting unit 1140 as target subjects. Note that, the system controller 1131 may set all the other vehicles appearing in the frame images as target subjects or only the other vehicle closest to the vehicle 1900 as a target subject by measuring the distances to other vehicles with the distance sensors 1170. On the other hand, the system controller 1131 extracts, in step S1104, the other vehicle determined in step S1102 as a target subject.

The system controller 1131 checks, in step S1105, the target subject extracted in step S1103 or S1104 and determines whether the target subject has been detected to have a predetermined first positional relation in the frame image. The predetermined first positional relation is, for example, a relation in which the position detecting unit 1140 can recognize the road surface 1920 between the other vehicle 1910 and the vehicle 1900 in the frame image. In this case, the position detecting unit 1140 detects, between the other vehicle 1910 and the vehicle 1900, a pixel area in which the movement vector through the adjacent frame images is zero, for example. By detecting such a pixel area, it is possible to recognize the road surface 1920 between the other vehicle 1910 and the vehicle 1900. In this manner, when determining that the target subject has the predetermined first positional relation, the system controller 1131 proceeds to step S1106. When determining that the target subject does not have the predetermined first positional relation, the system controller 1131 proceeds to step S1107.

The system controller 1131 determines, in step S1106, the main period and the accompanied prior period or the prior period and the posterior period as described with reference to FIG. 5. In response to this, the memory controller 1137 copies the moving image files corresponding to these periods in the non-volatile buffer 1153 which is an overwriting-prohibition area. That is, the system controller 1131 copies, as the processing in step S1106, the moving image files including the prior period and the main period in the non-volatile buffer 1153 which is an overwriting-prohibition area. Alternatively, the system controller 1131 copies, as the processing in step S1106, the moving image files including the prior period, the main period, and the posterior period in the non-volatile buffer 1153 which is an overwriting-prohibition area.

The system controller 1131 determines, in step S1108, whether a video-recording stop signal has been received. The video-recording stop signal is generated, for example, as the vehicle 1900 stops traveling or by a user operating a stop button. When determining that the video-recording stop signal has been received, the system controller 1131 causes the camera unit 1110 to stop imaging, stops recording the generated moving image files in the ring buffer format, and terminates a series of processing. When determining that the video-recording stop signal has not been received, the system controller 1131 returns to step S1101 to continue a series of processing.

When determining that the target subject does not have the predetermined first positional relation in step S1105, the system controller 1131 copies the moving image files until a predetermined period has passed from the event occurrence in the non-volatile buffer 1153, which is an overwriting-prohibition area, and proceeds to step S1106. When, for example, determining that the target subject does not have the predetermined first positional relation until three minutes has passed from the event occurrence, the system controller 1131 copies the moving image files until that point of time in the non-volatile buffer 1153, which are overwriting-prohibition areas, as event recording files. Specifically, when determining that the target subject does not have the predetermined first positional relation in step S1105, the system controller 1131 proceeds to step S1107 to determine whether a predetermined time has passed from the event occurrence. When determining that the predetermined time has not passed, the system controller 1131 returns to step S1105 to continue determining whether the target subject has been detected to have the predetermined first positional relation in the frame image. When determining that the predetermined time has passed, the system controller 1131 proceeds to step S1106.

Note that, when determining that the target subject does not have the predetermined first positional relation in step S1105, the system controller 1131 may copy the moving image files in the non-volatile buffer 1153 so that overwriting of the moving image files is prohibited until the storage capacity of the memory card 1150 reaches its limit. In addition, in the case of performing this record processing, the system controller 1131 may copy the moving image file corresponding to the section, in which the image has changed, in the non-volatile buffer 1153 which is an overwriting-prohibition area.

Specifically, when determining, in step S1105, that the target subject does not have the predetermined first positional relation, the system controller 1131 analyses whether the image has changed in the newest moving image file while continuing recording the generated moving image files. Specifically, the analysis is performed by comparing adjacent frame images to determine whether the images are matched. Then, when the images are matched in adjacent frames in all the frames, the system controller 1131 determines that the image has not changed in the moving image file. When only a part of a frame image is not matched, the system controller 1131 determines that the image has changed. Note that, when a part of an image area which is narrow relative to a frame image is changed, the system controller 1131 may determine that the image has not changed as a whole.

When determining that the image has not changed in the newest moving image file, the system controller 1131 causes the memory controller 1137 to erase, from the memory card 1150, the image file corresponding to the section in which the image has not changed. On the other hand, when determining that the image has changed, the system controller 1131 causes the memory controller 1137 to determine whether the ring buffer 1152 of the memory card 1150 has been exhausted, that is, whether the memory areas, of the ring buffer 1152, recording the moving image files generated before the event occurrence have been used up. When the memory controller 1137 determines that the memory areas have been used up, the system controller 1131 determines that there is no memory area for recording new moving image files and terminates a series of processing. At this time, the memory controller 1137 may change all the memory areas 1151 of the memory card 1150 to the non-volatile buffer 1153. On the other hand, when the memory controller 1137 determines that the memory areas have not been used up, the system controller 1131 returns to step S1102 to continue determining whether the target subject has the predetermined first positional relation by following the target subject in the frame images generated sequentially.

By adding such processing, it is possible to continuously record the state after the event occurrence until the ring buffer 1152 is exhausted and to more effectively utilize the stored moving image files. In addition, by erasing the image files in which there is no change in the subject, it is possible to record the moving image files including a later period and to store the moving image files having a high utility value.

Note that, it has been described that another vehicle has been successfully detected and extracted as a target subject in step S1103 or S1104 in the present embodiment. However, if a target subject is not extracted, the detection of another vehicle may be repeatedly performed until, for example, the ring buffer 1152 is exhausted. Alternatively, the system controller 1131 may proceed directly to step S1105, determine, when a target subject is not detected, that no target subject satisfies the predetermined first positional relation, and proceed to step S1108.

In addition, it has been described that the relation in which the road surface 1920 can be recognized between the other vehicle 1910 and the vehicle 1900 in the frame image in step S1105 is defined as the predetermined first positional relation in the present embodiment. However, another positional relation may be defined as the predetermined first positional relation. For example, a relation in which the outline of the other vehicle 1910 is in the frame image, that is, the entire image of the other vehicle 1910 can be grasped or a relation in which the image of the other vehicle 1910 is matched with a shape pattern stored in advance may be defined as the predetermined first positional relation.

When the relation in which the entire image of the other vehicle 1910 can be grasped is defined as the predetermined first positional relation, the position detecting unit 1140 detects, in step S1105, the outline of the other vehicle 1910 which becomes small as the other vehicle 1910 is separated, for example. By detecting that all the points consisting the outline of the other vehicle 1910 radially converge, it is possible to determine that the entire image of the other vehicle 1910 is in the frame image.

Second Embodiment

In the first embodiment of the present invention, it has been described, as an example, that a time when a target subject detected to have a predetermined first positional relation in an acquired frame image is set as an end time and that a period until a predetermined time passes from the end time is set as a posterior period. In addition, it has been described that a positional relation in which, for example, the road surface 1920 can be recognized between the other vehicle 1910 and the vehicle 1900 is defined as a predetermined first positional relation. The present embodiment exemplifies that a period from when a target subject is detected to have a predetermined first positional relation in a frame image until the target subject is detected to have a predetermined second positional relation is set as a posterior period. For example, it is described that a positional relation in which the position detecting unit 1140 detects that the other vehicle 1910 has changed its direction or a positional relation in which the image of the other vehicle 1910 becomes too small is defined as the predetermined second positional relation. Note that, a configuration of a drive recorder, which is an example of an image recording apparatus according to the second embodiment, is similar to the configuration of the drive recorder 1100 according to the first embodiment.

Figure 7A:
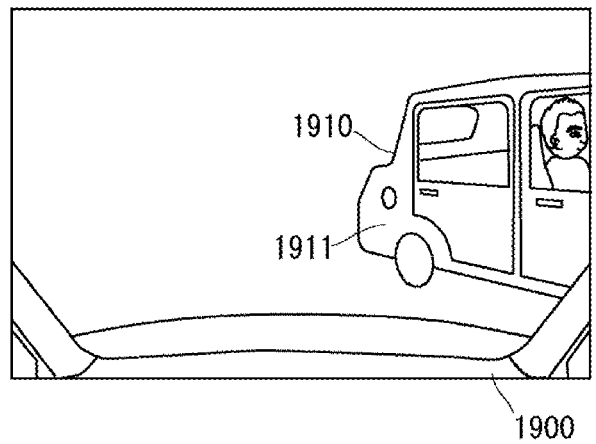
FIG. 7A is a schematic diagram showing a state in which another vehicle is separated according to a second embodiment.
Figure 7B:
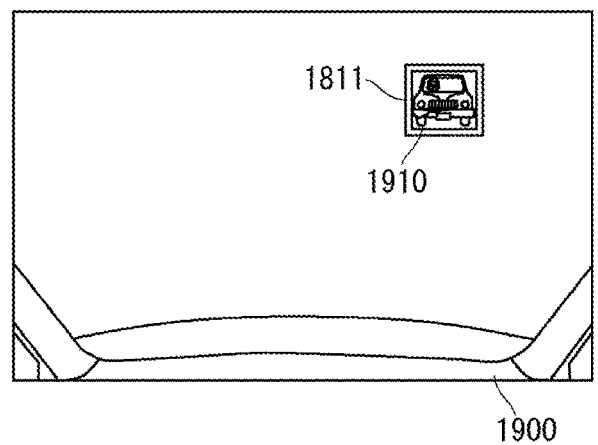
FIG. 7B is a schematic diagram showing a state in which the other vehicle is separated according to the second embodiment.

In the present embodiment, a time, for example, when the other vehicle 1910 is detected to have changed its direction as shown in FIG. 7A or when the image of the other vehicle 1910 becomes too small as shown in FIG. 7B is set as an end point of a posterior period. After the other vehicle 1910 has the positional relation shown in FIG. 7A or 7B, it is expected that the other vehicle 1910 is out of the frame image or that only an unclear image is obtained. Thus, when such a positional relation is detected, the posterior period is terminated. By setting a period until a target vehicle has a predetermined second positional relation with the vehicle as a posterior period, it is possible to more precisely record the period until the other vehicle 1910 cannot be recognized, and it is expected to widen the usage range of the images.

In the present embodiment, after detecting that the road surface 1920 between the vehicle 1900 and the other vehicle 1910, the position detecting unit 1140 detects, for example, whether a side-face part 1911 of the other vehicle 1910 can be recognized as shown in FIG. 7A. In this case, the position detecting unit 1140 stores, for example, shape patterns of various vehicle models when viewed from different angles and color patterns and determines whether the image of the other vehicle 1910 is similar to the side-face part of another vehicle stored in advance. When detecting the side-face part 1911 by image matching, the position detecting unit 1140 determines that the other vehicle 1910 has changed its direction and outputs time information about when the frame image has been imaged to the system controller 1131.

Alternatively, after detecting the road surface 1920 between the vehicle 1900 and the other vehicle 1910, the position detecting unit 1140 may detect, for example, whether the image of the other vehicle 1910 has become smaller than a predetermined size as shown in FIG. 7B. In this case, the position detecting unit 1140 follows, for example, the size of a detection frame 1811 which is the detection area of the other vehicle 1910. When the size of the detection frame 1811 has become smaller than the predetermined size, the position detecting unit 1140 outputs information about time when the frame image is imaged to the system controller 1131.

Figure 8:
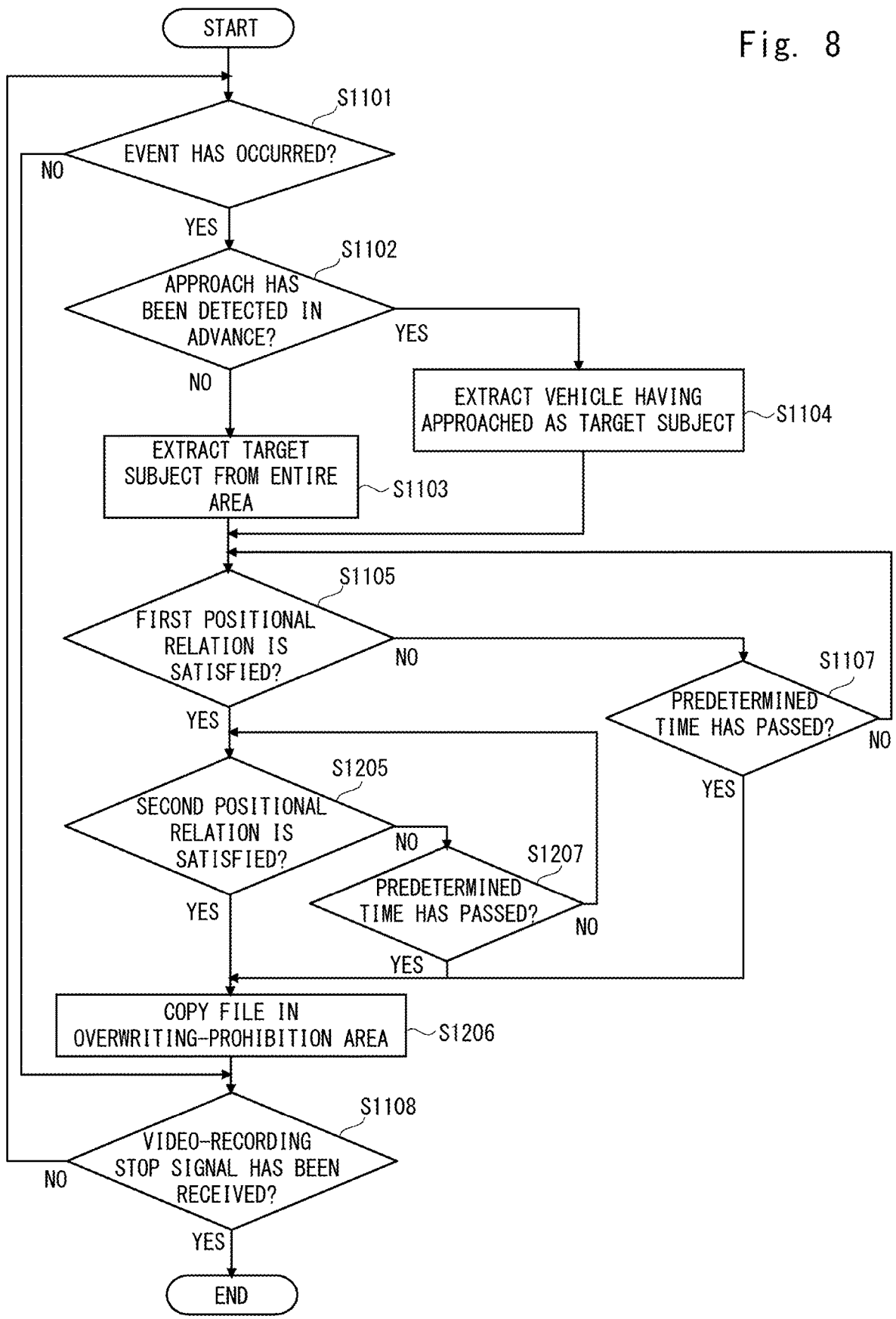
FIG. 8 is a flowchart showing a control procedure of a drive recorder according to the second embodiment.

Next, a control procedure of a drive recorder 1100 according to the present embodiment is described. FIG. 8 is a flowchart showing a control procedure according to the present embodiment. In the flowchart in FIG. 8, step S1206 is added instead of step S1106 in the flowchart in FIG. 6. In addition, steps S1205 and S1207 are added. The same step number is assigned to the processing common to the that in the flowchart in FIG. 6, and the description thereof is appropriately omitted.

When determining, in step S1105, that a target subject has been detected to have a predetermined first positional relation in the frame image, the system controller 1131 proceeds to step S1205. The target subject mentioned here is, for example, the other vehicle 1910. The predetermined first positional relation is, for example, a relation in which the position detecting unit 1140 can detect the road surface 1920 between the other vehicle 1910 and the vehicle 1900 in the frame image.

The system controller 1131 determines, in step S1205, whether the other vehicle 1910 has a predetermined second positional relation in the frame image. The predetermined second positional relation may be, for example, a relation in which the position detecting unit 1140 can detect that the other vehicle 1910 has changed its direction or a relation in which the position detecting unit 1140 can detect that the image of the other vehicle 1910 becomes smaller than a predetermined size. When determining that the other vehicle 1910 has the predetermined second positional relation in the frame image, the system controller 1131 proceeds to step S1206. When determining that the other vehicle 1910 does not have the predetermined second positional relation, the system controller 1131 proceeds to step S1207.

The system controller 1131 determines, in step S1206, the main period and the prior period as described in the first embodiment and further determines a posterior period in which an end time is set at the time when the other vehicle 1910 has been detected to have the predetermined second positional relation in the frame image. In response to this, the memory controller 1137 copies the moving image files corresponding to these three periods in the non-volatile buffer 1153 which is an overwriting-prohibition area.

The system controller 1131 copies, in step S1207, the moving image files until a predetermined period has passed after the target subject has been determined to satisfy the predetermined first positional relation or until a predetermined period has passed after the predetermined period has passed in step S1107 in the non-volatile buffer 1153 which is an overwriting-prohibition area, and proceeds to step S1206. For example, when determining that the target subject does not have the predetermined second positional relation until three minutes passes after the target subject has been detected to satisfy the predetermined first positional relation or after the predetermined period has passed in step S1107, the system controller 1131 copies, as an event recording file, the moving image files until that point of time in the non-volatile buffer 1153 which is an overwriting-prohibition area. Specifically, when determining that the target subject does not have the predetermined second positional relation in step S1205, the system controller 1131 proceeds to step S1207 to determine whether a predetermined time has passed from the event occurrence. When determining that the predetermined time has not passed, the system controller 1131 returns to step S1205 to continue determining whether the target subject has been detected to have the predetermined second positional relation in the frame image. When determines that the predetermined time has passed, the system controller 1131 proceeds to step S1206.

Note that, when determining that the target subject does not have the predetermined first positional relation in step S1205, the system controller 1131 may copy the moving image files in the non-volatile buffer 1153 so that overwriting of the moving image files is prohibited until the storage capacity of the memory card 1150 reaches its limit. In addition, in the case of performing such record processing, the system controller 1131 may copy the moving image file corresponding to the section, in which the image has changed, in the non-volatile buffer 1153 which is an overwriting-prohibition area.

Specifically, when determining, in step S1205, that the target subject does not have the predetermined second positional relation, the system controller 1131 analyses whether the image has changed in the newest moving image file while continuing recording the generated moving image files. Specifically, the analysis is performed by comparing adjacent frame images to determine whether the images are matched. Then, when the images are matched in adjacent frames in all the frames, the system controller 1131 determines that the image has not changed in the moving image file. When only a part of a frame image is not matched, the system controller 1131 determines that the image has changed. Note that, when a part of an image area which is narrow relative to a frame image is changed, the system controller 1131 may determine that the image has not changed as a whole.

When determining that the image has not changed in the newest moving image file, the system controller 1131 causes the memory controller 1137 to erase, from the memory card 1150, the image file corresponding to the section in which the image has not changed. On the other hand, when determining that the image has changed, the system controller 1131 causes the memory controller 1137 to determine whether the ring buffer 1152 of the memory card 1150 has been exhausted, that is, whether the memory areas, of the ring buffer 1152, recording the moving image files generated before the event occurrence have been used up. When the memory controller 1137 determines that the memory areas have been used up, the system controller 1131 determines that there is no memory area for recording new moving image files and terminates a series of processing. At this time, the memory controller 1137 may change all the memory areas 1151 of the memory card 1150 to the non-volatile buffer 1153. On the other hand, when the memory controller 1137 determines that the memory areas have not been used up, the system controller 1131 returns to step S1205 to continue determining whether the other vehicle 1910 has the predetermined second positional relation in the frame images generated sequentially.

By adding such processing, it is possible to continuously record the state after the event occurrence until the ring buffer 1152 is exhausted and to more effectively utilize the stored moving image files. In addition, by erasing the image files in which there is no change in the subject, it is possible to record the moving image files including a later period and to store the moving image files having a high utility value.

Note that, it has been described that the relation in which the road surface 1920 can be recognized between the other vehicle 1910 and the vehicle 1900 in the frame image in step S1105 is defined as the predetermined first positional relation in the present embodiment. However, another positional relation may be defined as the predetermined first positional relation. For example, a relation in which the outline of the other vehicle 1910 is in the frame image, that is, the entire image of the other vehicle 1910 can be grasped or a relation in which the image of the other vehicle 1910 is matched with a shape pattern stored in advance may be defined as the predetermined first positional relation.

In addition, it has been described that the relation in which the other vehicle 1910 is detected to have changed its direction in the frame image in step S1205 or the relation in which the image of the other vehicle 1910 is detected to become smaller than a predetermined size is defined as the predetermined second positional relation in the present embodiment. However, another positional relation may be defined as the predetermined second positional relation. For example, a relation in which the other vehicle 1910 is out of the frame image or a relation in which an emergency vehicle, such as a patrol car, can be detected near the other vehicle 1910 may be defined as the predetermined second positional relation.

Third Embodiment

In the first and second embodiments, it has been described, as an example, that a target subject is another vehicle. A third embodiment exemplifies that a target subject is a person. Note that, a configuration of a drive recorder, which is an example of an image recording apparatus according to the third embodiment, is similar to the configuration of the drive recorder 1100 according to the first embodiment.

Figure 9A:
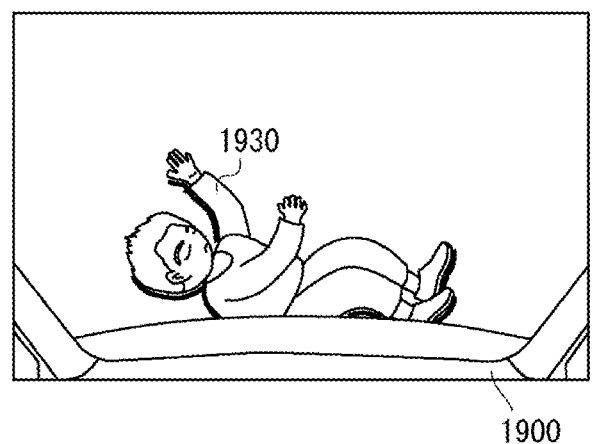
FIG. 9A is a schematic diagram showing a state immediately after an event occurs and a state in which another vehicle is separated according to a third embodiment.
Figure 9B:
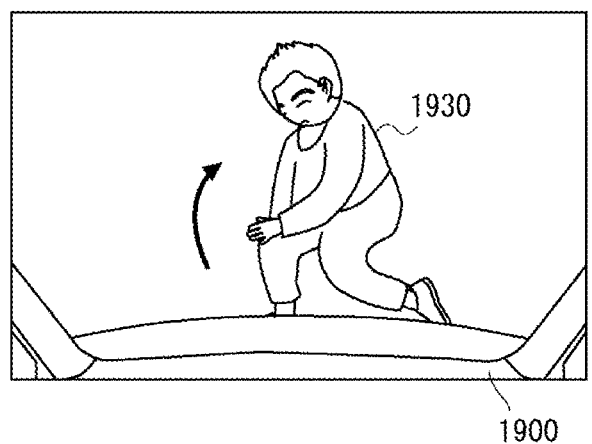
FIG. 9B is a schematic diagram showing a state immediately after the event occurs and a state in which the other vehicle is separated according to the third embodiment.

FIG. 9A shows a state immediately after the vehicle 1900 collides with a pedestrian 1930, and FIG. 9B shows a state in which the pedestrian 1930 is detected to get up thereafter. As shown in FIG. 9A, when a collision of the vehicle 1900 with the pedestrian 1930 occurs, the system controller 1131 recognizes that an event has occurred by receiving an acceleration signal greater than a threshold caused by the collision. The image imaged immediately after the collision has the range enclosed by the outside frame of FIG. 9A. As shown in FIG. 9A, a pedestrian having collided with a vehicle normally falls or crouches near the vehicle.

As shown in FIG. 9B, when the images for a period until the pedestrian 1930 is detected to get up are recorded, it is expected to capture the actions of the pedestrian 1930 after the accident, the injuries of the pedestrian 1930, how the pedestrian 1930 has been rescued, and the like. With the information, it is possible to objectively determine the situation of damage after the accident, which is used to identify the persons who are involved in the accident, to pursue the criminal liability, and the like.

In the present embodiment, the system controller 1131 recognizes the pedestrian 1930 as a target subject, and the position detecting unit 1140 determines whether the pedestrian 1930 has been detected to have a predetermined positional relation in the frame image. The position detecting unit 1140 may determine, for example, whether the pedestrian 1930 has gotten up as shown in FIG. 9B or whether the whole body of the pedestrian 1930 has been detected. Alternatively, the position detecting unit 1140 may determine whether the pedestrian 1930 has been out of the frame image or whether, the image of the pedestrian 1930 has become smaller than a predetermined size.

Figure 10:
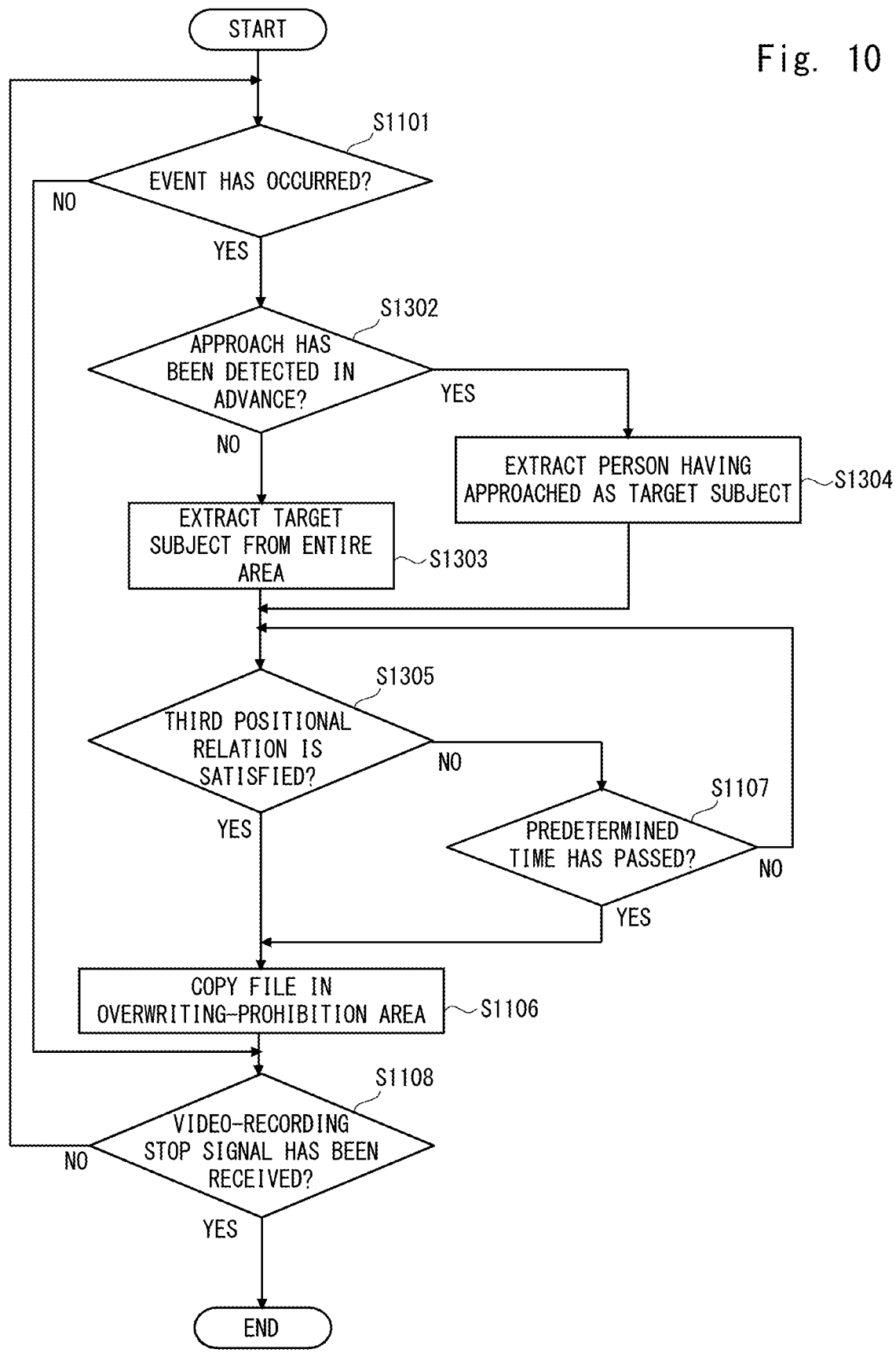
FIG. 10 is a flowchart showing a control procedure of a drive recorder according to the third embodiment.

Here, a control procedure of the drive recorder 1100 according to the present embodiment is described. FIG. 10 is a flowchart showing a control procedure according to the present embodiment. In the flowchart in FIG. 10, steps S1302, S1303, S1304, and S1305 are added instead of steps S1102, S1103, S1104, and S1105 in the flowchart in FIG. 6. The same step number is assigned to the processing common to that in the flowchart in FIG. 6, and the description thereof is appropriately omitted.

The system controller 1131 determines, in step S1302, whether a history of the frame images received from the image processing unit 1135 has captured the approach of a person. When, for example, a pedestrian has become gradually larger and been the largest at the moment of the event detection, the system controller 1131 determines that the pedestrian has approached the vehicle 1900. In this manner, when determining that a series of frame images has captured the approach of the person, the system controller 1131 proceeds to step S1304 or to step S1303 otherwise.

The system controller 1131 causes, in step S1303, the position detecting unit 1140 to detect a person in the entire area of each frame image in the moving image data generated after the event occurrence. Specifically, the position detecting unit 1140 stores, for example, shape patterns of person appearances to detect a person by image matching. The system controller 1131 extracts the person detected by the position detecting unit 1140 as a target subject. Note that, the system controller 1131 may set all the persons appearing in the frame images as target subjects or only the person closest to the vehicle 1900 as a target subject by measuring the distances to persons with the distance sensors 1170. On the other hand, the system controller 1131 extracts, in step S1304, the person determined in step S1302 as a target subject.

The system controller 1131 checks, in step S1305, the target subject extracted in step S1303 or S1304 and determines whether the target subject has been detected to have a predetermined third positional relation in the frame image. The predetermined third positional relation is, for example, a relation in which the position detecting unit 1140 can detect that the pedestrian 1930 has gotten up. In this case, the position detecting unit 1140 detects, for example, a plurality of points indicating a part of the pedestrian 1930, such as the head, the body, or the legs, and determines whether the pedestrian 1930 is lying, standing, or the like according to the positional relation of the points. In this manner, when determining that the target subject has the predetermined third positional relation, the system controller 1131 proceeds to step S1106. When determining that the target subject does not have the predetermined third positional relation, the system controller 1131 proceeds to step S1107. The following processing is similar to that of the control procedure in the first embodiment.

In the above manner, although a person is set as a target subject, it is possible to more appropriately record the state of the target subject after the event occurrence similarly to the case of setting another vehicle as a target subject.

Note that, it has been described that a person has been successfully detected and extracted as a target subject in step S1303 or S1304 in the present embodiment. However, if a target subject is not extracted, the detection of a person may be repeatedly performed until, for example, the ring buffer 1152 is exhausted. Alternatively, the system controller 1131 may proceed directly to step S1305, determine, when a target subject is not detected, that no target subject satisfies the predetermined third positional relation, and proceed to step S1108.

In addition, it has been described that the relation in which the position detecting unit 1140 can detect that the pedestrian 1930 has gotten up in the frame image in step S1305 is defined as the predetermined third positional relation in the present embodiment. However, another positional relation may be defined as the predetermined third positional relation. For example, a relation in which the outline of the pedestrian 1930 is in the frame image, that is, the entire image of the pedestrian 1930 can be grasped or a relation in which the image of the pedestrian 1930 is detected to become smaller than a predetermined size may be defined as the predetermined third positional relation.

Figure 11:
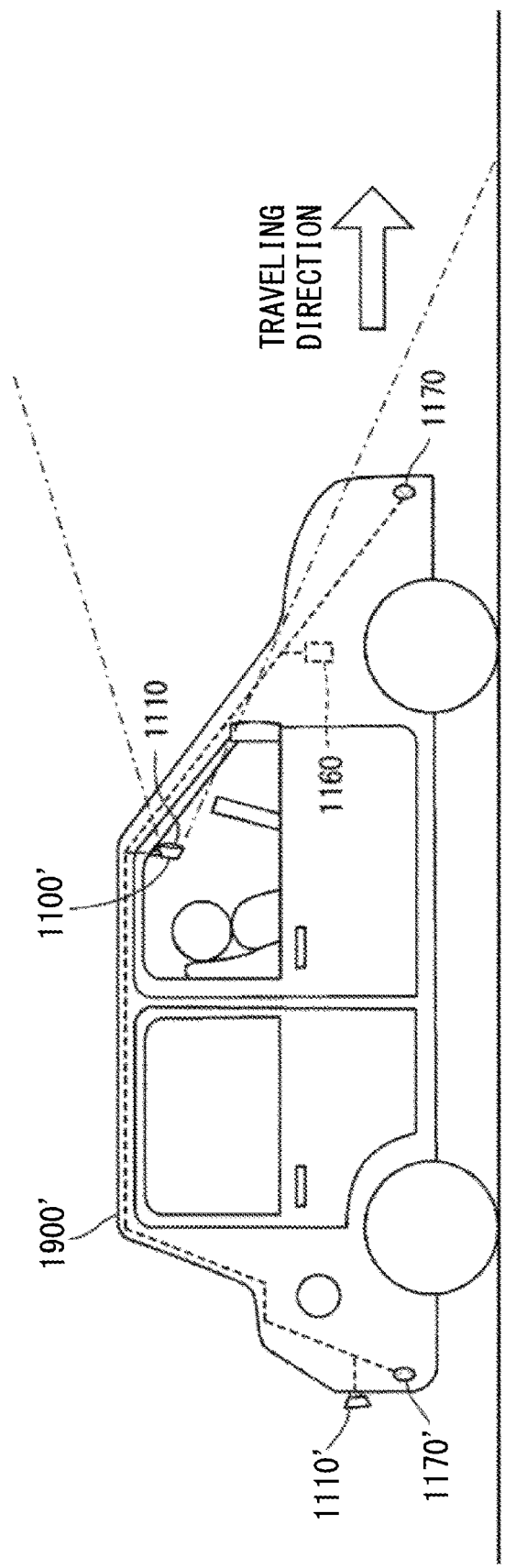
FIG. 11 is a schematic diagram showing that another drive recorder is installed in a vehicle.

The three embodiments have been described above. Furthermore, an example in which a slight modification is made is described below. FIG. 11 is a schematic diagram showing that another drive recorder 1100' is installed in a vehicle 1900'. The vehicle 1900' differs from the above the vehicle 1900 in that a plurality of distance sensors 1170' is provided at the rear. The drive recorder 1100' differs from the above drive recorder 1100 in that a camera unit 1110' that images the rear peripheral environment is provided in addition to the camera unit 1110. With the vehicle 1900' and the drive recorder 1100' configured in this manner, it is possible to handle a target colliding from a rear side.

In this case, by configuring the memory IF 1138 so as to load two memory cards 1150, it is possible to use one memory card 1150 for the front side, and the other memory card 1150 for the rear side. Naturally, the memory areas of one memory card 1150 may be divided and used for the front side and the rear side.

As long as the acceleration sensor 1160 further detects the direction of the detected acceleration, it is possible for the system controller 1131 to determine the direction in which the target has collided with the vehicle 1900' with the acceleration signal. When determining that the target has collided from a front side, the system controller 1131 performs the above writing control to be performed after event occurrence to the image data acquired from the camera unit 1110. On the other hand, when determining that the target has collided from a rear side, the system controller 1131 performs the above writing control to be performed after event occurrence to the image data acquired from the camera unit 1110'. That is, the system controller 1131 extracts direction information related to the occurrence direction in which the event has occurred to the vehicle 1900' from the acceleration signal and determines, based on the direction information, whether image data to be subjected to the position detection is the image data from the camera unit 1110 or the image data from the camera unit 1110'. Then, the system controller 1131 acquires the determined image data and performs the above writing control. With the vehicle 1900' and the drive recorder 1100' configured in this manner, it is possible to more precisely record information about the target vehicle related to the event.

Note that, it has been described that another vehicle is set as a target subject in the first and second embodiments and that a person is set as a target subject in the third embodiment. However, these embodiments may be combined. For example, the system controller 1131 may extract both another vehicle and a person appearing in the frame images as target subjects and set a period until each of them satisfies a predetermined positional relation as a main period. Naturally, the system controller 1131 may extract, for example, targets other than an automobile or a person, such as an animal and a two-wheeled vehicle, that causes an event as target subjects.

In addition, it has been described, as an example, that the memory areas 1151 are divided into the continuous ring buffer 1152 and the continuous non-volatile buffer 1153 in the above embodiments. However, the ring buffer 1152 and the non-volatile buffer 1153 may not be physically continuous. Furthermore, it has been described that a part of the ring buffer 1152 is changed to the non-volatile buffer 1153 and a target moving image file is copied in the changed non-volatile buffer 1153 in the above embodiments. However, the writing control for prohibiting overwriting is not limited to this. For example, by setting a flag for prohibiting overwriting in a memory area recording a target moving image file, the area may be treated as the non-volatile buffer 1153. In this case, it is possible to omit the processing for copying the moving image file.

In addition, it has been described, as an example, that the memory areas 1151 of one memory card 1150 are divided into the ring buffer 1152 and the non-volatile buffer 1153 in the above embodiments. However, both the memory card 1150 used as the ring buffer 1152 and the memory card 1150 used as the non-volatile buffer 1153 may be loaded. Alternatively, a memory mounted in the main body unit 1130 may be used instead of the detachable memory card 1150. Furthermore, by implementing the memory IF 1138 as a wireless IF, the above writing control may be performed to a memory which is not physically adjacent.

In addition, it has been described that a moving image file, for example, for one minute is set as a unit for writing control in the above embodiments. However, the unit for writing control is not limited to one moving image file. For example, writing control may be performed in frame units.

Furthermore, target image data is not limited to moving image data and may be, for example, still image data obtained by interval photographing.

In addition, it has been described that the acceleration sensor 1160 is used as a sensor that detects event occurrence in the above embodiments. However, another sensor may be used. For example, a strain sensor that detects deformation caused by a collision of a target or a temperature sensor that detects an abnormal temperature may be used. Naturally, a plurality of sensors may be used in combination. Furthermore, sensors, such as the acceleration sensor 1160, may be incorporated in the drive recorder. Strain signals, temperature signals, and the like, which are outputs from these sensors, are used as event signals for detecting an event similarly to an acceleration signal.

In addition, it has been described that the acceleration sensor 1160 outputs an acceleration signal to the system controller 1131 and the system controller 1131 determines whether the acceleration signal is greater than a threshold in the above embodiments. However, the method in which the system controller 1131 detects an event is not limited to this. For example, by presetting a threshold in output values of the acceleration sensor 1160, the acceleration sensor 1160 may output only an acceleration signal greater than the threshold to the system controller 1131. In this case, it is possible to set a time when the system controller 1131 has received the acceleration signal as an event detection time. Naturally, the above other sensors may be used in a similar manner.

In addition, it has been described that the history of the frame images received from the image processing unit 1135 is used in order to acquire information before event detection in the above embodiments. However, the method for acquiring information before event detection is not limited to this. For example, an approach of a target may be detected with a history of distance signals from the distance sensors 1170. Since the multiple distance sensors 1170 are provided at the front of the vehicle 1900, any one of the distance sensors 1170 can detect an approach of a target. Furthermore, the branched processing for intensively searching an area in a certain direction may be omitted depending on the capability or the like of the position detecting unit 1140. In the case of omitting the branched processing, steps S1102 and S1104 in FIG. 6 are omitted, for example.

In addition, it has been described that the distance sensors 1170 are installed at the vehicle 1900 and the system controller 1131 acquires distance signals from the distance sensors 1170 in the above embodiments. However, by providing, for example, a compound eye to the camera unit 1110, a distance to a target may be calculated from a compound-eye image. In this case, the connection with the distance sensors 1170 can be omitted, and which makes the apparatus have a simpler configuration.

In addition, it has been described, as an example, that the vehicle collides head-on with another vehicle as shown in FIGS. 4A, 4B, 7A, and 7B in the first and second embodiments. However, the configuration of the present invention is applicable when, for example, the vehicle 1900 collides with the other vehicle 1910 from a rear side.

In addition, it has been described that an end of a posterior period is set at a time when a fixed time T2 has passed in the first and the third embodiments and an end of a posterior period is set at a time when a target subject satisfies a predetermined positional relation in a frame image in the second embodiment. However, these conditions may be combined. For example, either longer period of a period until the fixed time T2 has passed after the position detection or a period until the target subject satisfies the predetermined positional relation in the frame image may be set as a posterior period. In this case, it is possible to record information until, for example, the target subject cannot be recognized while a recording time after the event occurrence is sufficiently secured. In either case, the image file recorded so as not to be overwritten is usable in inspections or the like of the accident.

Fourth Embodiment

Next, a drive recorder 2100 according to a fourth and a fifth embodiments is described. Note that, in the description of the fourth and fifth embodiments, reference signs in 2000s having the last three digits in common are newly assigned to elements which are the same as or directly corresponding to those in the first to third embodiments, and the description thereof is appropriately omitted. The drive recorder 2100, which is an example of an image recording apparatus according to the fourth and fifth embodiments, is installed and used in a vehicle 2900 corresponding to the vehicle 1900 similarly to the drive recorder 1100 according to the first to third embodiments (see FIG. 1).

Figure 12:
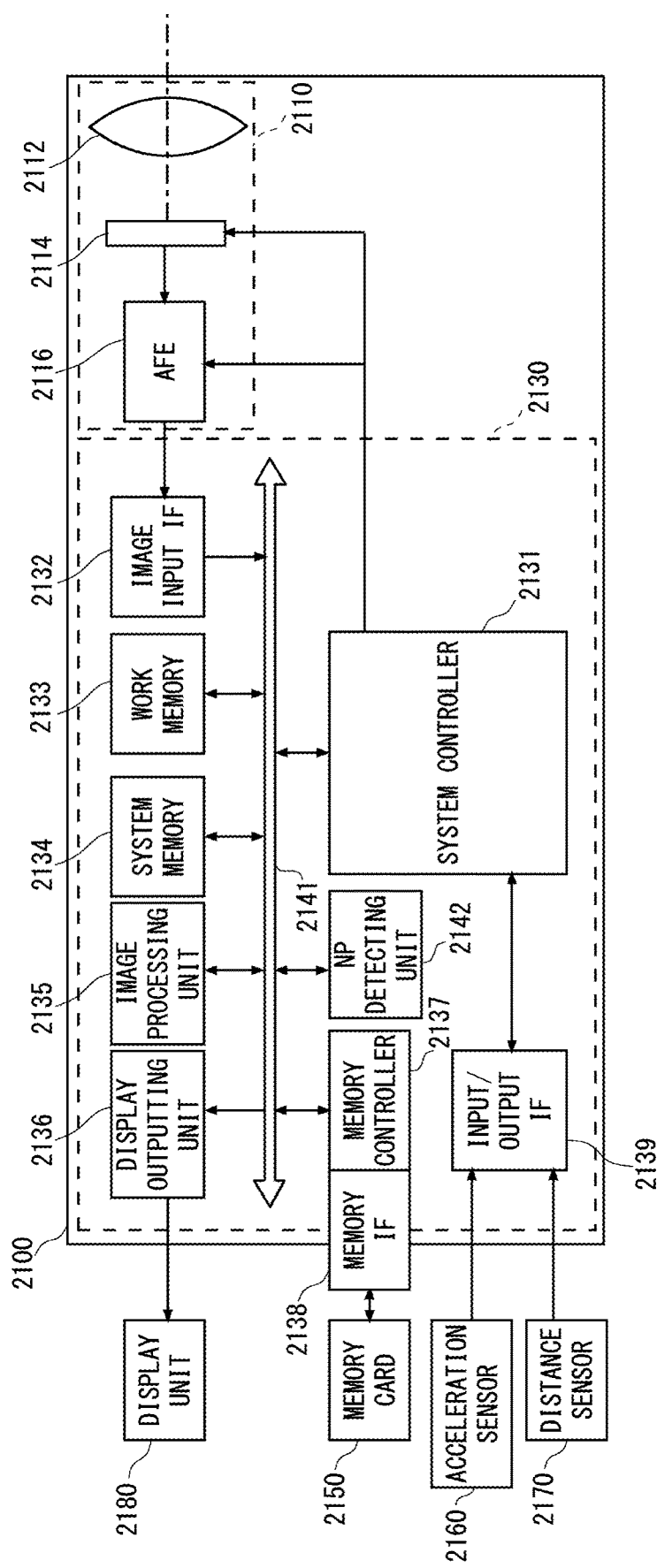
FIG. 12 is a block diagram showing a configuration of a drive recorder according to a fourth embodiment.

FIG. 12 is a block diagram showing a configuration of the drive recorder 2100. The drive recorder 2100 mainly includes a camera unit 2110 and a main body unit 2130.

The camera unit 2110 mainly includes a lens 2112, an image sensor 2114, and an analogue front end (AFE) 2116. The camera unit 2110 has the same constituent elements as those of the camera unit 1110 in the first to third embodiments.

The main body unit 2130 mainly includes a system controller 2131, an image input IF 2132, a work memory 2133, a system memory 2134, an image processing unit 2135, a display outputting unit 2136, a memory controller 2137, a memory IF 2138, an input/output IF 2139, a bus line 2141, and a number-plate (NP) detecting unit 2142. The main body unit 2130 has the same constituent elements as those of the main body unit 1130 according to the first to third embodiments, except that the number-plate detecting unit 2142 is included instead of the constituent element corresponding to the position detecting unit 1140 (see FIG. 2).

The system controller 2131 according to the present embodiment detects, based on distance signals input from distance sensors 2170 via the input/output IF 2139, a target, such as another vehicle or a person, approaching within a distance less than a predetermined threshold from the vehicle 2900. Thus, the system controller 2131 also functions as a target detecting unit.

The number-plate detecting unit 2142 receives frame image data subjected to predetermined pre-processing by the image processing unit 2135 and detects whether there is a number plate in the frame image. When detecting a number plate from a frame image, the number-plate detecting unit 2142 detects that a positional relation of another vehicle with the vehicle 2900 satisfies a predetermined condition. Thus, the number-plate detecting unit 2142 functions as a condition detecting unit that detects whether a positional relation of a target with the vehicle 2900 satisfies a predetermined condition.

The frame image data received by the number-plate detecting unit 2142 includes time information about when the frame image has been imaged. The number-plate detecting unit 2142 stores, for example, shapes, numbers, and characters specific to number plates and information about arrangements and colors thereof to detect a number plate by matching the frame image with the stored information. Note that, when a certain detecting area is designated in the entire area of the frame image, the number-plate detecting unit 2142 detects whether there is a number plate in the designated area. When detecting a number plate, the number-plate detecting unit 2142 outputs time information about when the frame image is imaged to the system controller 2131. Note that, the number-plate detecting unit 2142 may further output the information about the numbers, characters, colors, and the like detected by matching to the system controller 2131.

Figure 13A:
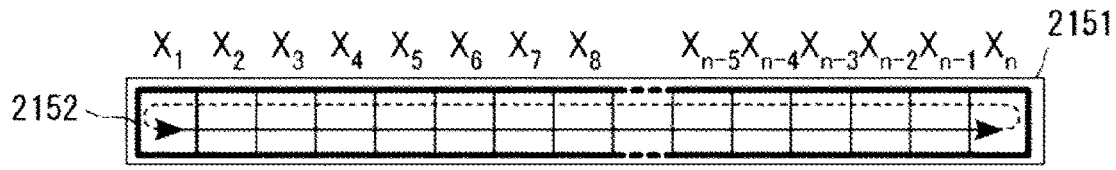
FIG. 13A is a conceptual diagram for explaining a ring buffer set in a memory card according to the fourth embodiment.
Figure 13B:
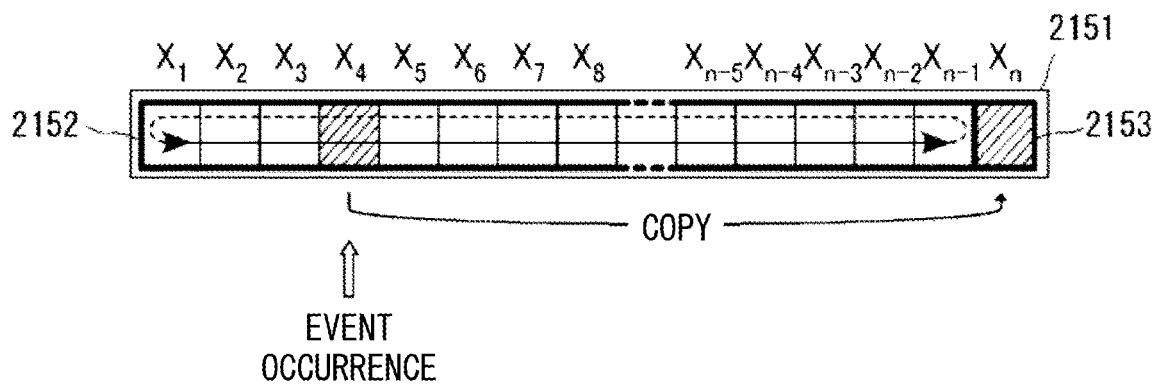
FIG. 13B is a conceptual diagram for explaining a ring buffer set in the memory card according to the fourth embodiment.
Figure 13C:
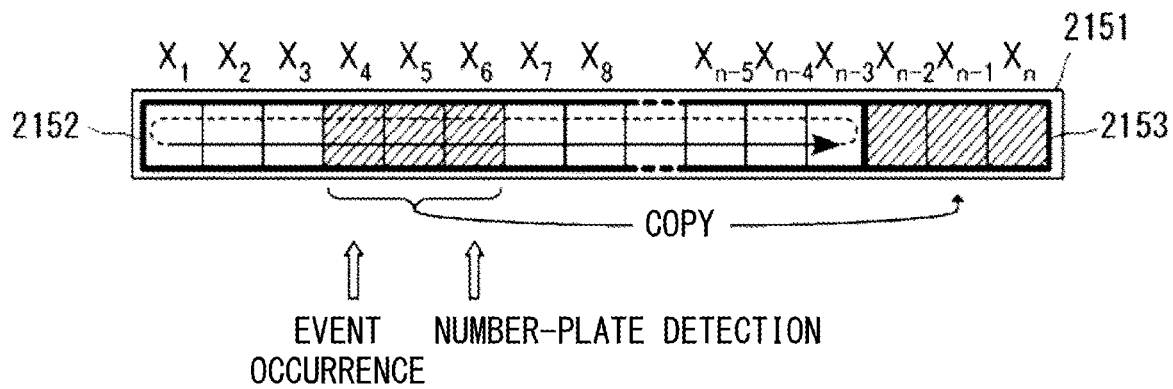
FIG. 13C is a conceptual diagram for explaining a ring buffer set in the memory card according to the fourth embodiment.

FIGS. 13A, 13B, and 13C are conceptual diagrams for explaining a ring buffer set in a memory card 2150. FIG. 13A is a conceptual diagram showing that all memory areas 2151 of the memory card 2150 are used as a ring buffer 2152. Detailed control by the memory controller 2137 in this case is similar to the control by the memory controller 1137 in FIG. 3A, and the description thereof is omitted. FIG. 13B is a conceptual diagram for explaining writing control in a conventional drive recorder. Detailed control by the memory controller 2137 in this case is similar to the control by the memory controller 1137 in FIG. 3B, and the description thereof is omitted.

Conventional drive recorders have been insufficient from the viewpoint of recording the state of a target vehicle after event occurrence. As shown in FIG. 13B, overwriting of moving image data, for example, for one minute including the event occurrence time is only prohibited. In the case of a collision with another vehicle, the target vehicle has already collided with the vehicle at the detection time, and the lower part of the target vehicle is usually in the blind spot of the drive recorder. The lower part of the target vehicle does not appear in the image imaged at this time, and importance information for identifying the target vehicle, such as a number plate, cannot be included. The information obtained from the image is insufficient to identify the target vehicle.

For this reason, moving image data including a period from an event occurrence time until the number-plate detecting unit 2142 detects that the positional relation of a target vehicle with the vehicle 2900 satisfies a predetermined condition is written in a memory so that the moving image data is not overwritten in the present embodiment. Specifically, moving image data including a period from an event occurrence time until a number plate has been detected in continuously imaged images is copied in a non-volatile buffer 2153. FIG. 13C is a conceptual diagram for explaining writing control in the drive recorder 2100 according to the present embodiment. The methods for adding the non-volatile buffer 2153, for moving target moving image data, for recording in the ring buffer 2152, and the like are similar to those of the example in FIG. 13B, but a moving image file to be copied in the non-volatile buffer 2153 is different in the present embodiment.

It is assumed that a moving image file recorded in a memory area X4 of the ring buffer 2152 includes an event occurrence time in its imaging period similarly to the example in FIG. 13B. The camera unit 2110 continues imaging after the event, and the generated moving image files are successively written in X5, X6, and the like. The number-plate detecting unit 2142 continuously acquires the frame image data constituting these moving image files and detects, in the frame image, whether there is a number plate (number-plate detection). Here, it is assumed that the frame image in which the number-plate detection has occurred for the first time after the event occurrence is included in the moving image file recorded in a memory area X6. Note that, the time indicated by the time information of the frame image in which the number-plate detection has occurred for the first time after the event occurrence is referred to as a number-plate detection time.

In this case, the memory controller 2137 copies three moving image files of the moving image file in X4 including the event occurrence time, the moving image file in X5, and the moving image file in X6 including the number-plate detection time in the non-volatile buffer 2153 as event recording files. That is, the memory areas from Xn−2 to Xn are changed to the non-volatile buffer 2153, and the target moving image files are copied in the non-volatile buffer 2153. If different moving image files are recorded in the non-volatile buffer 2153, the non-volatile buffer 2153 is added so as to avoid the memory areas recording the moving image files.

Figure 14A:
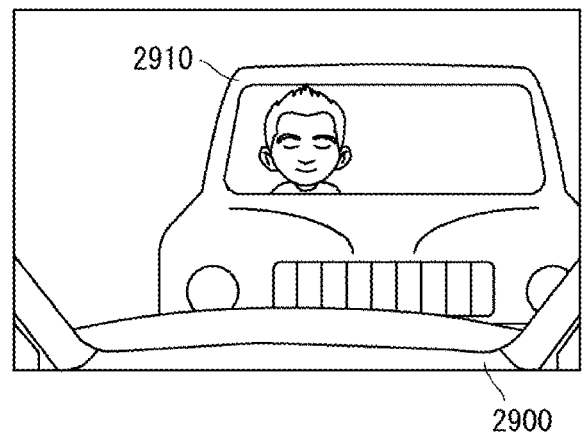
FIG. 14A is a schematic diagram showing a state immediately after an event occurs and a state in which another vehicle is separated according to the fourth embodiment.

When the period until the number plate has been detected in the continuously imaged images is kept so that overwriting of the images is prohibited in this manner, the information about the number plate of the target vehicle is included in the image data. An example of this case is described. FIG. 14A shows the state immediately after another vehicle 2910 has collided with the vehicle 2900 (immediately after event occurrence), and FIG. 14B shows that the other vehicle 2910 is separated from the vehicle 2900 thereafter and that a number plate 2912 is detected.

When a collision as shown in FIG. 14A occurs, the system controller 2131 recognizes that an event has occurred by receiving an acceleration signal greater than a threshold caused by the collision. The image imaged at this time has the range enclosed by the outside frame of FIG. 14A. That is, the other vehicle 2910 is too close to the vehicle 2900 that the lower part thereof does not appear. Only with this image, the number plate 2912 of the other vehicle 2910 close to the vehicle 2900 at the accident time cannot be detected. Thus, it is impossible to attain an object of identifying the other vehicle 2910.

Figure 14B:
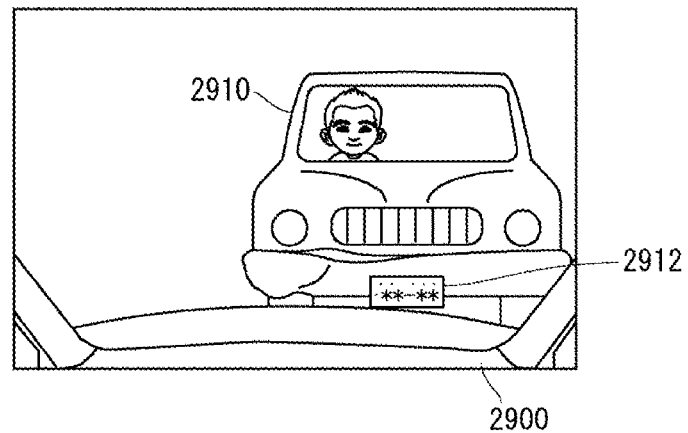
FIG. 14B is a schematic diagram showing a state immediately after the event occurs and a state in which the other vehicle is separated according to the fourth embodiment.

However, as long as an image including the number plate 2912 as shown by the range enclosed by the outside frame of FIG. 14B is acquired when the vehicle 2900 is relatively separated from the other vehicle 2910 by a certain distance or more after the accident, it is possible to identify the other vehicle 2910 after the accident and further attain the above object. This greatly increases the utility value of the images. For example, if the other vehicle 2910 escapes thereafter, it is easy to identify the driver. Note that, the image processing unit 2135 may generate a moving image file with information about the numbers, characters, and colors of the number plate 2912 and information about the name of the automobile inspection registration office, the application of the vehicle, and the like discriminated therefrom embedded in the frame images or add the information in the header of the moving image file.

Figure 15:
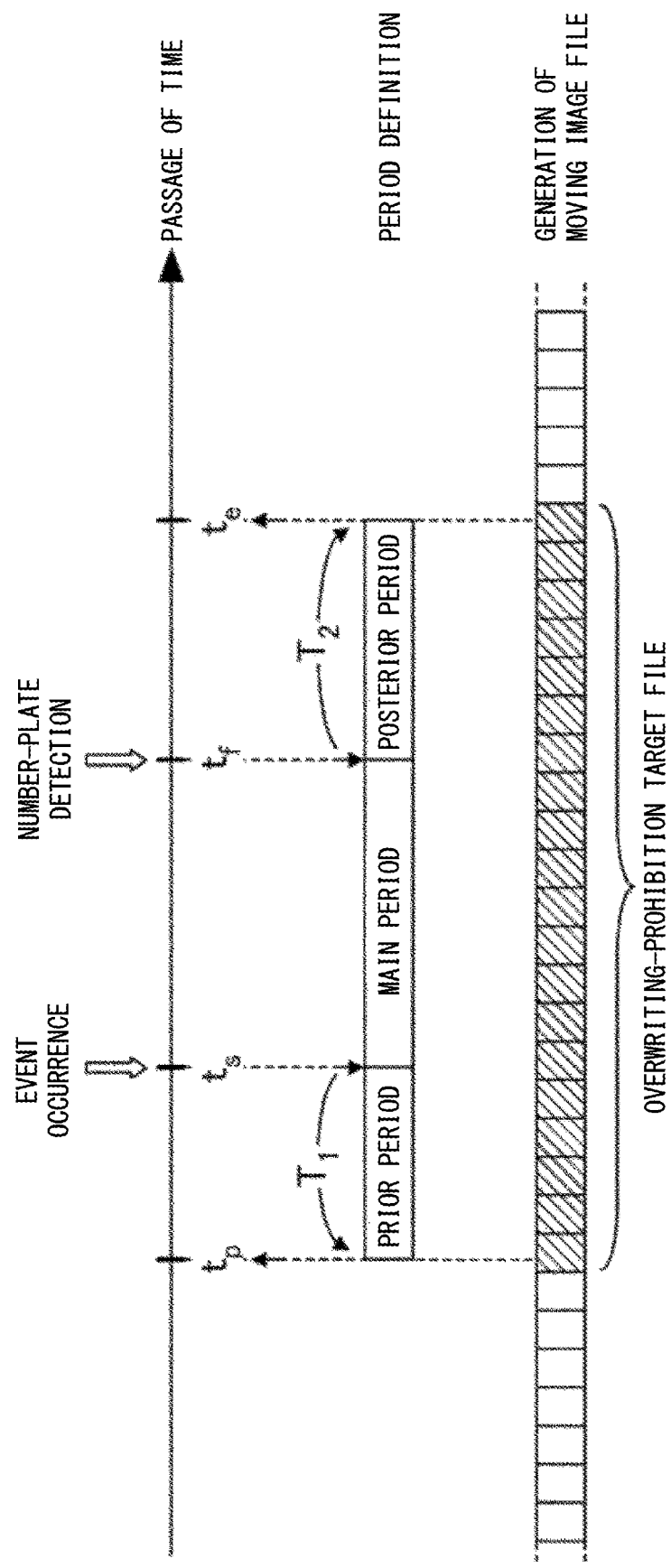
FIG. 15 is a diagram for explaining overwriting-prohibition target files over time according to the fourth embodiment.

As described above, when a moving image file including a period from an event occurrence time to a number-plate detection time is recorded so that the moving image file cannot be overwritten, the utility value of the moving image file after the accident is greatly increased. Furthermore, a storage period is added in the present embodiment. FIG. 15 is a diagram for explaining overwriting-prohibition target files over time according to the present embodiment. The drawing indicates the passage of time from the left to the right.

In the drawing, it is assumed that an event occurs at a time ts and that a number plate is detected in an image at a time tf. The period from the time ts to the time tf is set as a main period. Then, by setting a time tp going back from the time ts by a predetermined fixed time T1 as a start time and the time ts as an end time, a prior period from the start time to the end time is set before the main period. In addition, by setting the time tf as a start time and a time to after a predetermined fixed time T2 passes from the time tf as an end time, a posterior period from the start time to the end time is set after the main period.

Then, the moving image files including these three periods are set as overwriting-prohibition target files which are event recording files. That is, the moving image files are copied in the non-volatile buffer 2153. In this manner, by adding the prior and posterior periods, it is expected to widen the usage range of the images. For example, the approaching other vehicle 2910 can appear in the moving image files in the prior period, which is used to specify the cause of the accident, to confirm that the other vehicle appearing in the moving image files in the main period is the accident cause, and the like. In addition, an approaching rescuer and the escaping the other vehicle 2910 can appear in the moving image files in the posterior period, which is used to identify the persons who are involved in the accident, to pursue the criminal liability, and the like.

Figure 16:
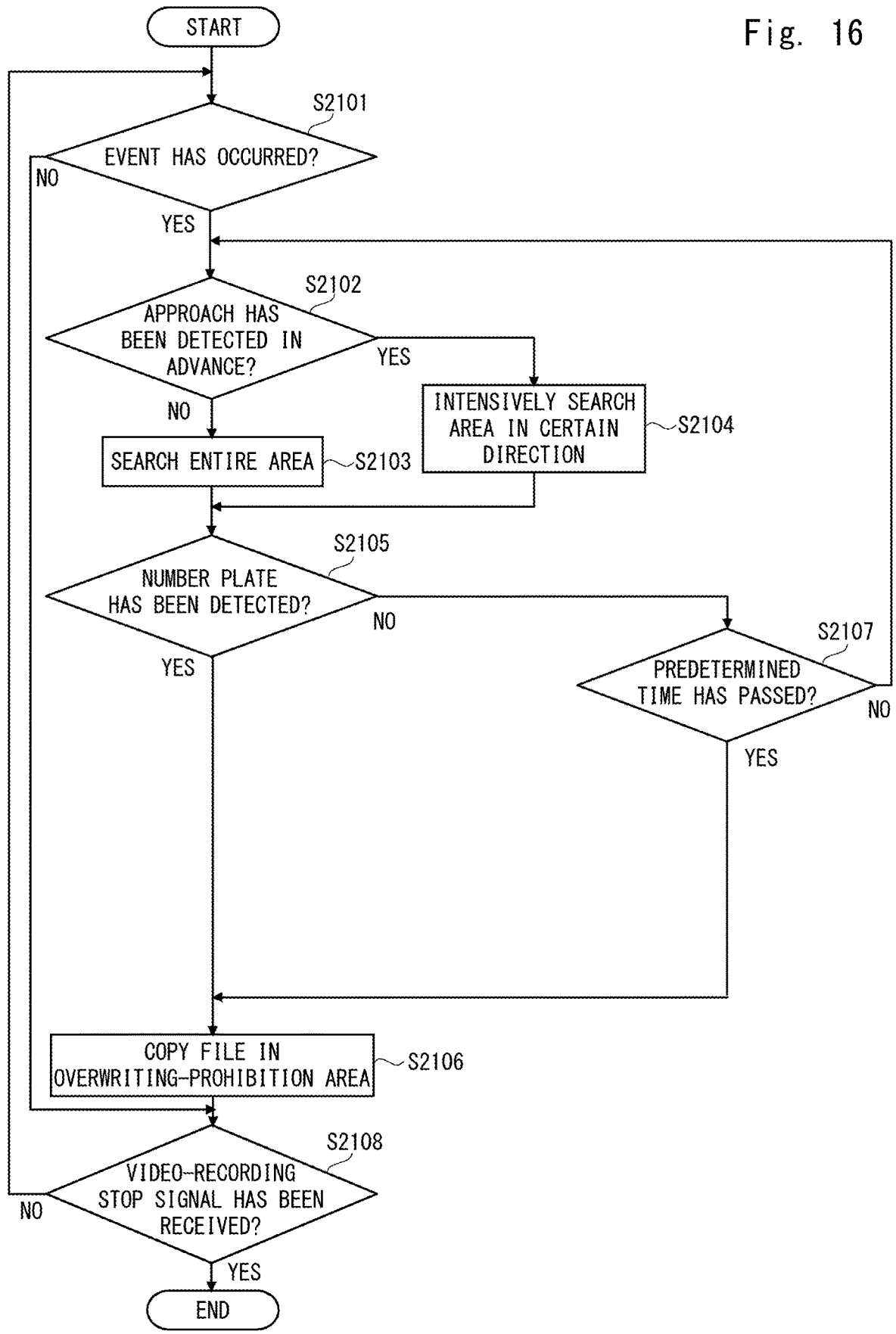
FIG. 16 is a flowchart showing a control procedure of the drive recorder according to the fourth embodiment.

Next, a control procedure of a drive recorder 2100 is described. FIG. 16 is a flowchart showing a control procedure of the drive recorder 2100. The procedure is started from when a traveling start preparation for the vehicle 2900 is completed. The completion of the traveling start preparation for the vehicle 2900 means, for example, starting the engine of the vehicle 2900, turning the power on, or the like. The drive recorder 2100 may operate at all times regardless of the state of the vehicle. The camera unit 2110 starts imaging as the procedure is started, and the image processing unit 2135 sequentially generates moving image files. Then, the memory controller 2137 successively records the moving image files in the memory card 2150 in the ring buffer format. The system controller 2131 monitors acceleration signals received from the acceleration sensor 2160. The following processing is performed during the control for recording the normal traveling.

The system controller 2131 determines, in step S2101, whether an acceleration signal greater than a threshold has been received from the acceleration sensor 2160, that is, whether an event has occurred. When determining that the acceleration signal greater than the threshold has been received, the system controller 2131 determines that an event has occurred and proceeds to step S2102. When determining that the acceleration signal greater than the threshold has not been received, the system controller 2131 proceeds to step S2108.

The system controller 2131 checks, in step S2102, a history of the distance signals received from the distance sensors 2170. As described above, the multiple distance sensors 2170 are provided at the front of the vehicle 2900, and any one of the distance sensors 2170 can detect an approach of a target vehicle. Thus, when determining that any one of the distance sensors 2170 has detected the approach of the target, the system controller 2131 proceeds to step S2104 or to step S2103 otherwise.

The system controller 2131 causes, in step S2103, the number-plate detecting unit 2142 to search for a number plate in the entire area of each frame image in the moving image data generated after the event occurrence. On the other hand, the system controller 2131 causes, in step S2104, the number-plate detecting unit 2142 to intensively search an area of each frame image in the moving image data generated after the event occurrence in the direction of an approaching object detected by the distance sensor 2170 before the event occurrence. For example, when the distance sensor 2170 that has detected the approaching object is installed to detect the distance in the right-side ¼ field of an image, the number-plate detecting unit 2142 determines the right-side ¼ of the image as a searching area. By limiting an area subjected to the number-plate detection, it is possible to perform number-plate detection processing at high speed, and it is expected that the other vehicle having the detected number plate is deeply connecting with the event.

The system controller 2131 determines, in step S2105, whether a number plate has been detected from the frame images. When determining that a number plate has been detected, the system controller 2131 proceeds to step S2106. When determining that no number plate has been detected, the system controller 2131 proceeds to step S2107.

The system controller 2131 determines, in step S2106, the main period and the accompanied prior period or the prior period and the posterior period as described with reference to FIG. 15. In response to this, the memory controller 2137 copies the moving image files corresponding to these periods in the non-volatile buffer 2153 which is an overwriting-prohibition area. That is, the system controller 2131 copies, as the processing in step S2106, the moving image files including the prior period and the main period in the non-volatile buffer 2153 which is an overwriting-prohibition area. Alternatively, the system controller 2131 copies, as the processing in step S2106, the moving image files including the prior period, the main period, and the posterior period in the non-volatile buffer 2153 which is an overwriting-prohibition area.

The system controller 2131 determines, in step S2108, whether a video-recording stop signal has been received. The video-recording stop signal is generated, for example, as the vehicle 2900 stops traveling or by a user operating a stop button. When determining that the video-recording stop signal has been received, the system controller 2131 causes the camera unit 2110 to stop imaging, stops recording the generated moving image files in the ring buffer format, and terminates a series of processing. When determining that the video-recording stop signal has not been received, the system controller 2131 returns to step S2101 to constitute a series of processing.

when no number plate has been detected in step S2105, the system controller 2131 copies the moving image files until a predetermined period has passed from the event occurrence in the non-volatile buffer 2153, which is an overwriting-prohibition area, and proceeds to step S2106. When, for example, no number plate has been detected until three minutes has passed from the event occurrence, the system controller 2131 copies the moving image files until that point of time in the non-volatile buffer 2153, which is an overwriting-prohibition area, as event recording files. Specifically, when no number plate has been detected in step S2105, the system controller 2131 proceeds to step S2107 to determine whether a predetermined time has passed from the event occurrence. When determining that the predetermined time has not passed, the system controller 2131 returns to step S2102 to continue detecting a number plate from the frame images. When determining that the predetermined time has passed, the system controller 2131 proceeds to step S2106.

Note that, when no number plate has been detected in step S2105, the system controller 2131 may copy the moving image files in the non-volatile buffer 2153 so that overwriting of the moving image files is prohibited until the storage capacity of the memory card 2150 reaches its limit. In addition, in the case of performing this record processing, the system controller 2131 may copy the moving image file corresponding to the section, in which the image has changed, in the non-volatile buffer 2153 which is an overwriting-prohibition area.

Specifically, when no number plate has been detected in step S2105, the system controller 2131 analyses whether the image has changed in the newest moving image file while continuing recording the generated moving image files. Specifically, the analysis is performed by comparing adjacent frame images to determine whether the images are matched. Then, when the images are matched in adjacent frames in all the frames, the system controller 2131 determines that the image has not changed in the moving image file. When only a part of a frame image is not matched, the system controller 2131 determines that the image has changed. Note that, when a part of an image area which is narrow relative to a frame image is changed, the system controller 2131 may determine that the image has not changed as a whole.

When determining that the image has not changed in the newest moving image file, the system controller 2131 causes the memory controller 2137 to erase, from the memory card 2150, the image file corresponding to the section in which the image has not changed. On the other hand, when determining that the image has changed, the system controller 2131 causes the memory controller 2137 to determine whether the ring buffer 2152 of the memory card 2150 has been exhausted, that is, whether the memory areas, of the ring buffer 2152, recording the moving image files generated before the event occurrence have been used up. When the memory controller 2137 determines that the memory areas have been used up, the system controller 2131 determines that there is no memory area for recording new moving image files and terminates a series of processing. At this time, the memory controller 2137 may change all the memory areas 2151 of the memory card 2150 to the non-volatile buffer 2153. On the other hand, when the memory controller 2137 determines that the memory areas have not been used up, the system controller 2131 returns to step S2102 to continue searching for a number plate in the frame images generated sequentially.

By adding such processing, it is possible to continuously record the state after the event occurrence until the ring buffer 2152 is exhausted and to more effectively utilize the stored moving image files. In addition, by erasing the image files in which there is no change in the subject, it is possible to record the moving image files including a later period and to store the moving image files having a high utility value.

Fifth Embodiment

It has been described, as an example, that a period until a predetermined time has passed from an end time is set as a posterior period in the fourth embodiment of the present invention. The fifth embodiment exemplifies that a posterior period is determined based on a relative positional relation of a target vehicle in a frame image.

Figure 17:
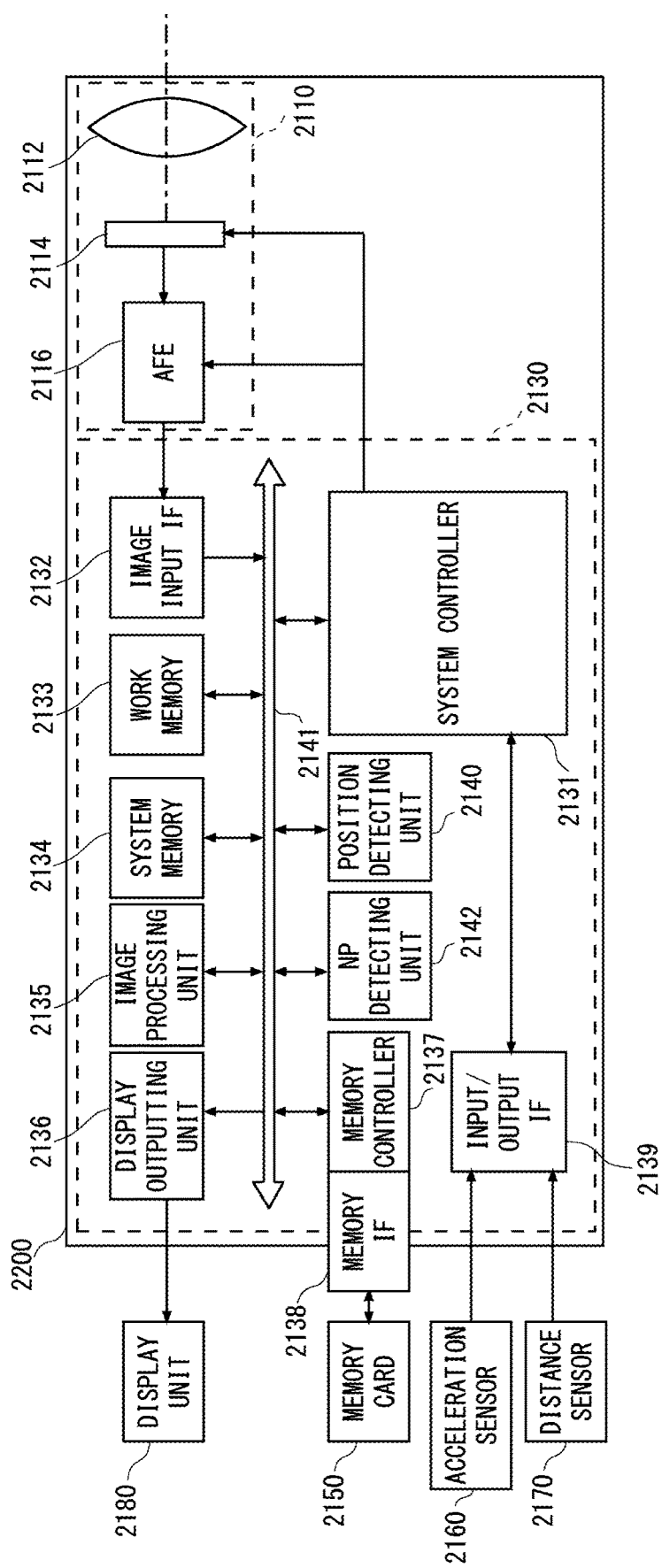
FIG. 17 is a block diagram showing a configuration of a drive recorder according to a fifth embodiment.

FIG. 17 is a block diagram showing a configuration of a drive recorder 2200 which is an example of an image recording apparatus according to a fifth embodiment. The drive recorder 2200 further includes a position detecting unit 2140 in the main body unit 2130 included in the drive recorder 2100 according to the fourth embodiment. The other configuration is similar to that of the drive recorder 2100. For this reason, the same reference signs are assigned to common functions or processing, and the description thereof is appropriately omitted.

Figure 18A:
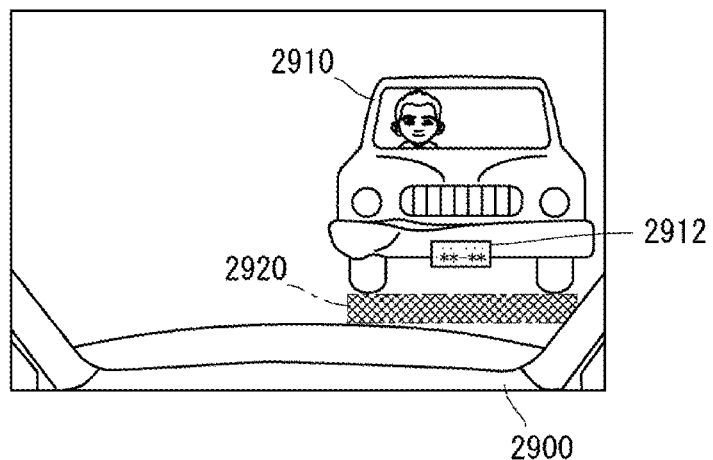
FIG. 18A is schematic diagram showing a state in which another vehicle is separated according to the fifth embodiment.

The position detecting unit 2140 receives the frame image data, to which the image processing unit 2135 has performed predetermined pre-processing, and detects whether the other vehicle 2910 has a predetermined positional relation in the frame image. The position detecting unit 2140 detects, for example, whether a road surface 2920 can be recognized between the other vehicle 2910 and the vehicle 2900 in the frame image as shown in FIG. 18A. In this case, the position detecting unit 2140 detects, between the number plate 2912 detected by the number-plate detecting unit 2142 and the vehicle 2900, a pixel area in which the movement vector through the adjacent frame images is zero, for example. By detecting such a pixel area, it is possible to recognize the road surface 2920 between the other vehicle 2910 and the vehicle 2900. When recognizing the road surface 2920 between the other vehicle 2910 and the vehicle 2900, the position detecting unit 2140 outputs time information about when the frame image has been imaged to the system controller 2131.

Figure 18B:
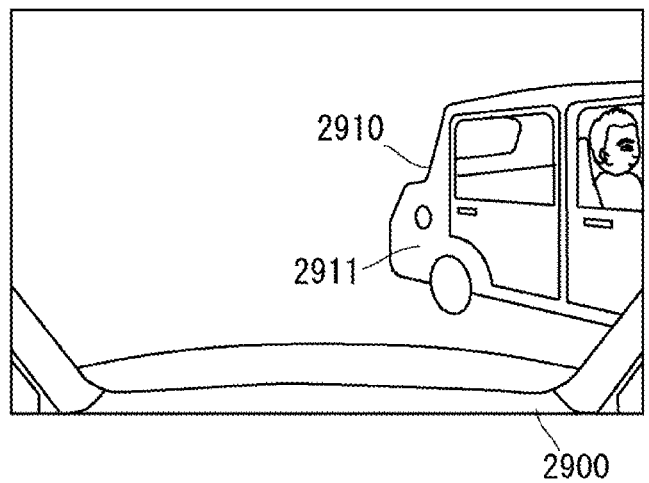
FIG. 18B is schematic diagram showing a state in which the other vehicle is separated according to the fifth embodiment.

The position detecting unit 2140 may detect, for example, whether a side-face part 2911 of the other vehicle 2910 can be recognized as shown in FIG. 18B. In this case, the position detecting unit 2140 stores, for example, shape patterns of various vehicle models when viewed from different angles and color patterns, specifies the image of the other vehicle 2910 having the number plate 2912 detected by the number-plate detecting unit 2142 by matching, and follows the image in the frame images. When determining that the image of the other vehicle 2910 is similar to the side-face part of another vehicle stored in advance, the position detecting unit 2140 outputs time information about when the frame image has been imaged to the system controller 2131. At this time, the position detecting unit 2140 may further output information about the model of the other vehicle detected by matching to the system controller 2131.

In the fifth embodiment, a period from when the number-plate detecting unit 2142 has detected the number plate 2912 until the position detecting unit 2140 has outputted the time information to the system controller 2131 is set as a posterior period, and the moving image files including three periods of the prior period, the main period, and the posterior period are copied in the non-volatile buffer 2153 as event recording files. In this manner, by setting a period until the target vehicle has a predetermined positional relation with the vehicle as the posterior period, it is expected to widen the usage range of the images. That is, the other vehicle 2910 is recognized as a wider range image, and it is expected to further record, for example, the model of the other vehicle 2910 and its features, such as deformation or scratches. Such information is very useful when, for example, an involving vehicle cannot be identified only from the number plate 2912. Note that, the image processing unit 2135 may generate a moving image file with the information, such as the model and color of the other vehicle 2910, embedded in the frame images or add the information to the header of the moving image file.

Figure 19:
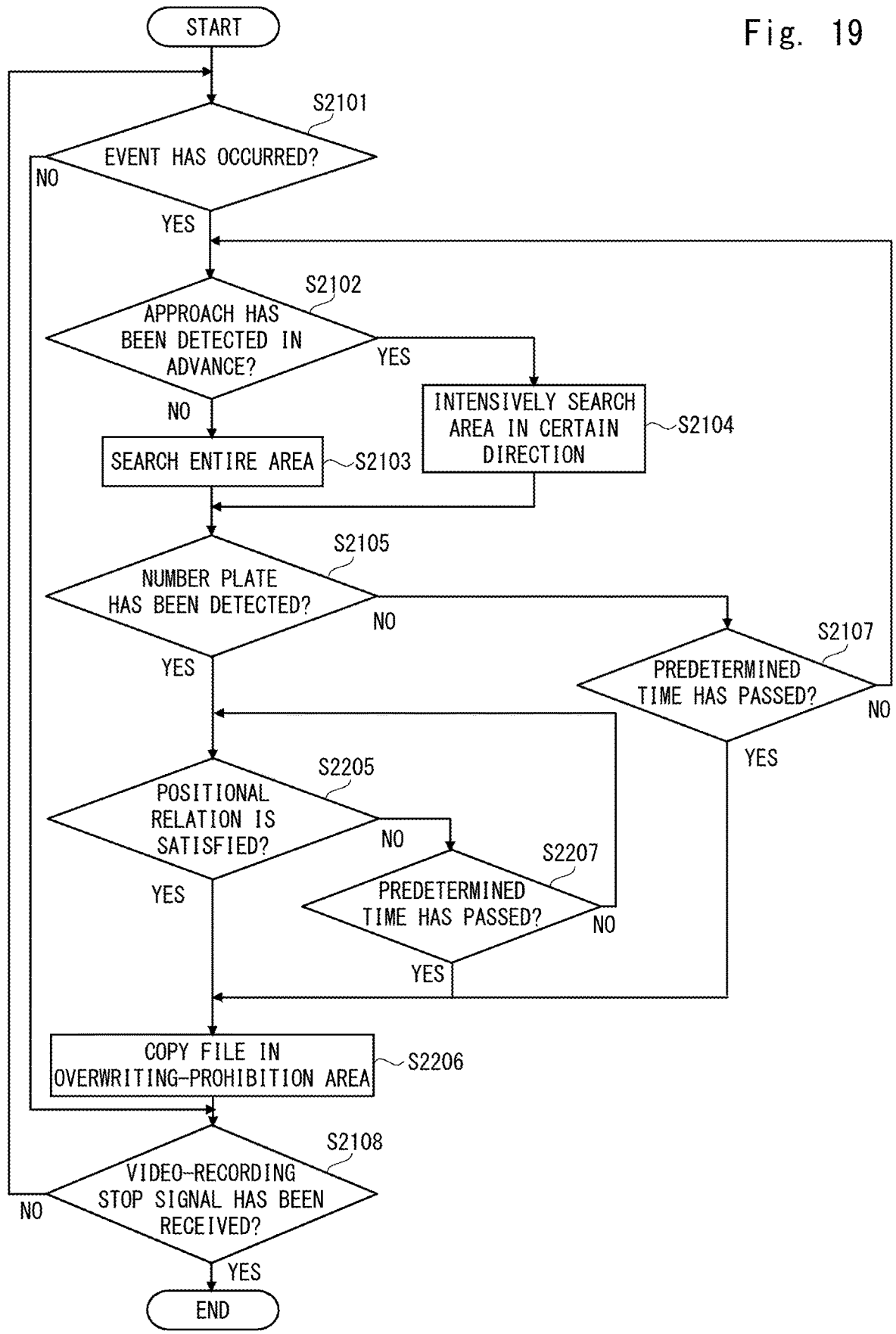
FIG. 19 is a flowchart showing a control procedure of the drive recorder according to the fifth embodiment.

Next, a control procedure of the drive recorder 2200 is described. FIG. 19 is a flowchart showing a control procedure of the drive recorder 2200. In the flowchart in FIG. 19, step S2106 in the flowchart in FIG. 16 is omitted, and steps S2205, S2206, and S2207 are added instead. Thus, the same reference sign is assigned to the processing common to that in the flowchart in FIG. 16, and the description thereof is appropriately omitted.

When determining that a number plate has been detected from the frame image in step S2105, the system controller 2131 proceeds to step S2205. When determining that no number plate has been detected from the frame image in step S2105, the system controller 2131 proceeds to step S2107. The system controller 2131 determines, in step S2205, whether the other vehicle 2910 has a predetermined positional relation in the frame image. When determining that the other vehicle 2910 has the predetermined positional relation, the system controller 2131 proceeds to step S2206. When determining that the other vehicle 2910 does not have the predetermined positional relation, the system controller 2131 proceeds step S2207.

The system controller 2131 determines, in step S2207, whether a predetermined time has passed from the event occurrence. When determining that the predetermined time has not passed, the system controller 2131 returns to step S2205 to continue determining whether the other vehicle 2910 has the predetermined positional relation in the frame image. When determining that the predetermined time has passed, the system controller 2131 proceeds to step S2206.

The system controller 2131 determines, in step S2206, the main period and the prior period as described in the fourth embodiment and further determines a posterior period in which an end time is set at the time when the other vehicle 2910 has been detected to have the predetermined positional relation in the frame image. In response to this, the memory controller 2137 copies the moving image files corresponding to these three periods in the non-volatile buffer 2153 which is an overwriting-prohibition area.

When the other vehicle 2910 has not been detected to have the predetermined positional relation in step S2205, the system controller 2131 copies the moving image files until a predetermined period has passed from the number-plate detection in the non-volatile buffer 2153, which is an overwriting-prohibition area, and proceeds to step S2206. For example, when the other vehicle 2910 has not been detected to have the predetermined positional relation, the system controller 2131 copies the moving image files until three minutes has passed from the number-plate detection in the non-volatile buffer 2153, which is an overwriting-prohibition area, as event recording files. Specifically, when determining that the target subject does not have the predetermined positional relation in step S2205, the system controller 2131 proceeds to step S2207 and determines whether a predetermined time has passed from the event occurrence. When determining that the predetermined time has not passed, the system controller 2131 returns to step S2205 to continue determining whether the target subject has been detected to have the predetermined positional relation in the frame image. When determining that the predetermined time has passed, the system controller 2131 proceeds to step S2206.

Note that, when the other vehicle 2910 has not been detected to have the predetermined positional relation in the frame image in step S2205, the system controller 2131 may copy the moving image files in the non-volatile buffer 2153 so that overwriting of the moving image files is prohibited until the storage capacity of the memory card 2150 reaches its limit. In addition, in the case of performing such record processing, the system controller 2131 may copy the moving image file corresponding to the section, in which the image has changed, in the non-volatile buffer 2153 which is an overwriting-prohibition area.

Specifically, when no number plate has been detected in step S2205, the system controller 2131 analyses whether the image has changed in the newest moving image file while continuing recording the generated moving image files. Specifically, the analysis is performed by comparing adjacent frame images to determine whether the images are matched. Then, when the images are matched in adjacent frames in all the frames, the system controller 2131 determines that the image has not changed in the moving image file. When only a part of a frame image is not matched, the system controller 2131 determines that the image has changed. Note that, when a part of an image area which is narrow relative to a frame image is changed, the system controller 2131 may determine that the image has not changed as a whole.

When determining that the image has not changed in the newest moving image file, the system controller 2131 causes the memory controller 2137 to erase, from the memory card 2150, the image file corresponding to the section in which the image has not changed. On the other hand, when determining that the image has changed, the system controller 2131 causes the memory controller 2137 to determine whether the ring buffer 2152 of the memory card 2150 has been exhausted, that is, whether the memory areas, of the ring buffer 2152, recording the moving image files generated before the event occurrence have been used up. When the memory controller 2137 determines that the memory areas have been used up, the system controller 2131 determines that there is no memory area for recording new moving image files and terminates a series of processing. At this time, the memory controller 2137 may change all the memory areas 2151 of the memory card 2150 to the non-volatile buffer 2153. On the other hand, when the memory controller 2137 determines that the memory areas have not been used up, the system controller 2131 returns to step S2102 to continue determining whether the other vehicle 2910 has a predetermined positional relation in the frame images generated sequentially.

By adding such processing, it is possible to continuously record the state after the event occurrence until the ring buffer 2152 is exhausted and to more effectively utilize the stored moving image files. In addition, by erasing the image files in which there is no change in the subject, it is possible to record the moving image files including a later period and to store the moving image files having a high utility value.

The fourth and fifth embodiments have been described above. Furthermore, an example in which a slight modification is made is described below. Similarly to the modified example in the first to third embodiments, another camera unit and distance sensor can be installed at the rear of the vehicle (see FIG. 11). With the vehicle and the drive recorder configured in this manner, it is possible to handle a target colliding from a rear side.

In this case, by configuring the memory IF 2138 so as to load two memory cards 2150, it is possible to use one memory card 2150 for the front side, and the other memory card 2150 for the rear side. Naturally, the memory areas of one memory card 2150 may be divided and used for the front side and the rear side.

As long as the acceleration sensor 2160 further detects the direction of the detected acceleration, it is possible for the system controller 2131 to determine the direction in which the target has collided with the vehicle with the acceleration signal. When determining that the target has collided from a front side, the system controller 2131 performs the above writing control to be performed after event occurrence to the image data acquired from the camera unit 2110. On the other hand, when determining that the target has collided from a rear side, the system controller 2131 performs the above writing control to be performed after event occurrence to the image data acquired from a camera unit provided at the rear of the vehicle. That is, the system controller 2131 extracts direction information related to the occurrence direction in which the event has occurred to the vehicle from the acceleration signal and determines, based on the direction information, whether the image data to be subjected to the number-plate detection is the image data from the camera unit 2110 or the image data from the camera unit provided at the rear of the vehicle. Then, the system controller 2131 acquires the determined image data and performs the above writing control. With the vehicle and the drive recorder configured in this manner, it is possible to more precisely record information about the target vehicle related to the event.

It has been described, as an example, that the memory areas 2151 are divided into the continuous ring buffer 2152 and the continuous non-volatile buffer 2153 in the above fourth and fifth embodiments. However, the ring buffer 2152 and the non-volatile buffer 2153 may not be physically continuous. Furthermore, it has been described that a part of the ring buffer 2152 is changed to the non-volatile buffer 2153 and a target moving image file is copied in the changed non-volatile buffer 2153 in the above embodiments. However, the writing control for prohibiting overwriting is not limited to this. For example, by setting a flag for prohibiting overwriting in a memory area recording a target moving image file, the area may be treated as the non-volatile buffer 2153. In this case, it is possible to omit the processing for copying the moving image file.

In addition, it has been described, as an example, that the memory areas 2151 of one memory card 2150 are divided into the ring buffer 2152 and the non-volatile buffer 2153 in the fourth and fifth embodiments. However, both the memory card 2150 used as the ring buffer 2152 and the memory card 2150 used as the non-volatile buffer 2153 may be loaded. Alternatively, a memory mounted in the main body unit 2130 may be used instead of the detachable memory card 2150. Furthermore, by implementing the memory IF 2138 as a wireless IF, the above writing control may be performed to a memory which is not physically adjacent.

In addition, it has been described that a moving image file, for example, for one minute is set as a unit for writing control in the fourth and fifth embodiments. However, the unit for writing control is not limited to one moving image file. For example, writing control may be performed in frame units. Furthermore, target image data is not limited to moving image data and may be, for example, still image data obtained by interval photographing.

When, for example, writing control is performed in frame units, by cutting out a file including a target period from the already generated moving image file, for example, for one minute to generate a new moving image file, and the new moving image file may be recorded in the non-volatile buffer as an event recording file. In this case, it is possible to keep a moving image file in which the event occurrence time is set as a starting point. Naturally, when a prior period is added, a time going back from the starting point by a predetermined time is set as a start time of the prior period. By managing a starting point in this manner, it is possible to certainly store, regardless of a time recording moving image files at a normal time, a moving image file including, for example, 10 seconds before the event occurrence and 10 seconds after the event occurrence as an event recording file.

In addition, it has been described that the acceleration sensor 2160 is used as a sensor that detects event occurrence in the fourth and fifth embodiments. However, another sensor may be used. For example, a strain sensor that detects deformation caused by a collision of a target or a temperature sensor that detects an abnormal temperature may be used. Naturally, a plurality of sensors may be used in combination. Furthermore, sensors, such as the acceleration sensor 2160, may be incorporated in the drive recorder.

In addition, it has been described that the acceleration sensor 2160 outputs an acceleration signal to the system controller 2131 and the system controller 2131 determines whether the acceleration signal is an event signal indicating event occurrence in the fourth and fifth embodiments. However, the method in which the system controller 2131 acquires an event signal is not limited to this. For example, by presetting a threshold in output values of the acceleration sensor 2160, the acceleration sensor 2160 may output only an acceleration signal greater than the threshold to the system controller 2131. In this case, it is possible to set a time when the system controller 2131 has received the acceleration signal as a time when the system controller 2131 has acquired an event signal. Naturally, the above other sensors may be used in a similar manner.

In addition, it has been described that the history of the distance signals from the distance sensors 2170 are used in the processing procedure described with reference to FIGS. 16 and 19. However, the method for acquiring information before event detection is not limited to this. With the moving image files before the event detection, it is possible to detect an approach of an target by monitoring, for example, the movement vector of a subject image. Furthermore, the branched processing for intensively searching an area in a certain direction may be omitted depending on the capability or the like of the number-plate detecting unit 2142. In the case of omitting the branched processing, steps S2102 and S2104 in FIG. 16 are omitted, for example.

In addition, it has been described that the distance sensors 2170 are installed at the vehicle 2900 and the system controller 2131 acquires distance signals from the distance sensors 2170 in the fourth and fifth embodiments. However, by providing, for example, a compound eye to the camera unit 2110, a distance to a target may be calculated from a compound-eye image. In this case, the connection with the distance sensors 2170 can be omitted, and which makes the apparatus have a simpler configuration.

In addition, it has been described that the system controller 2131 detects the number plate 2912 only from image data in the fourth and fifth embodiments. However, by calculating the distance between the vehicle 2900 and the other vehicle 2910 from, for example, a distance signal acquired from the distance sensor 2170 and estimating the size of the image of the number plate 2912 from the calculated distance, the information may be used for image matching. In this case, it is possible to detect a number plate more quickly and certainly.

In addition, the number-plate detecting unit 2142 may detect a number plate only having a size larger than a predetermined size in image data in the fourth and fifth embodiments. In this case, it is possible to reduce the possibility of erroneously detecting a number plate of another vehicle other than the other vehicle 2910 having collided.

In addition, it has been described, as an example, that the vehicle collides head-on with another vehicle as shown in FIGS. 14A, 14B, 18A, and 18B in the fourth and fifth embodiments. However, the configuration of the present invention is applicable when, for example, the vehicle 2900 collides with the other vehicle 2910 from a rear side. In this case, the system controller 2131 detects the number plate provided at the rear of the other vehicle 2910.

In addition, it has been described that an end of a posterior period is set at a time when a fixed time T2 has passed in the fourth embodiment and an end of a posterior period is set at a time when a target subject satisfies a predetermined positional relation in a frame image in the fifth embodiment. However, these conditions may be combined. For example, either longer period of a period until the fixed time T2 has passed after the number-plate detection or a period until the target subject satisfies the predetermined positional relation in the frame image may be set as a posterior period. In this case, it is possible to record information, such as the model, while a recording time after the event occurrence is sufficiently secured. In either case, the image file recorded so as not to be overwritten is usable in inspections or the like of the accident.

Sixth Embodiment

Next, a drive recorder 3100 according to a sixth embodiment is described. Note that, in the description of the sixth embodiment, reference signs in 3000s having the last three digits in common are newly assigned to elements which are the same as or directly corresponding to those in the first to third embodiments, and the description thereof is appropriately omitted. The drive recorder 3100, which is an example of an image recording apparatus according to the fourth and fifth embodiments, is installed and used in a vehicle 3900 corresponding to the vehicle 1900 similarly to the drive recorder 1100 according to the first to third embodiments (see FIG. 1).

Figure 20:
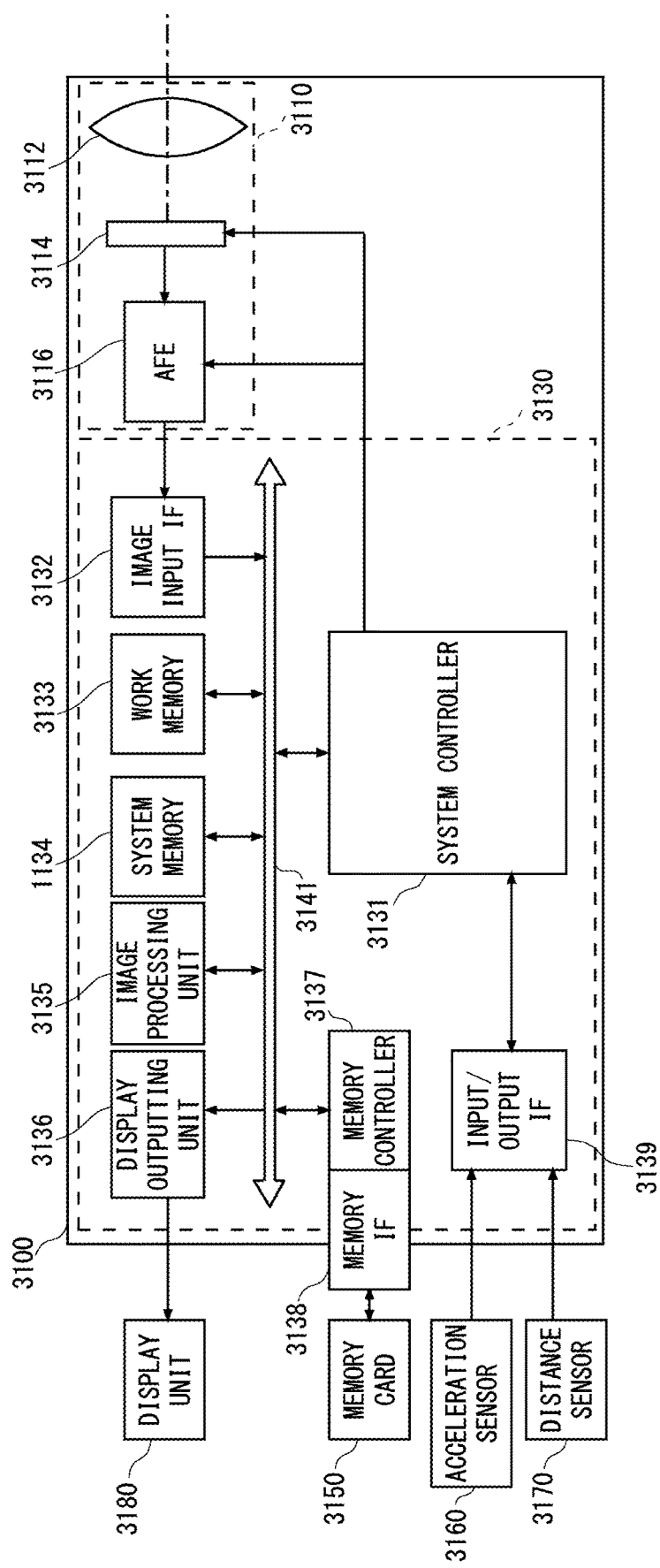
FIG. 20 is a block diagram showing a configuration of a drive recorder according to a sixth embodiment.

FIG. 20 is a block diagram showing a configuration of the drive recorder 3100. The drive recorder 3100 mainly includes a camera unit 3110 and a main body unit 3130.

The camera unit 3110 mainly includes a lens 3112, an image sensor 3114, and an analogue front end (AFE) 3116. The camera unit 3110 has the same constituent elements as those of the camera unit 1110 in the first to third embodiments.

The main body unit 3130 mainly includes a system controller 3131, an image input IF 3132, a work memory 3133, a system memory 3134, an image processing unit 3135, a display outputting unit 3136, a memory controller 3137, a memory IF 3138, an input/output IF 3139, and a bus line 3141. The main body unit 3130 has the same constituent elements as those of the main body unit 1130 according to the first to third embodiments, except that a constituent element corresponding to the position detecting unit 1140 is not included (see FIG. 2).

The system controller 3131 according to the present embodiment detects that a positional relation of a target with the vehicle 3900 satisfies a predetermined condition when a distance-signal acquiring unit acquires a distance signal indicating that the target is separated from the vehicle 3900 by a predetermined distance or more. Thus, the system controller 3131 functions as a condition detecting unit that detects whether a positional relation of a target with the vehicle 3900 satisfies a predetermined condition.

The system controller 3131 detects, based on a distance signal input from a distance sensor 3170 via the input/output IF 3139, a target, such as another vehicle or a person, approaching within a distance less than a predetermined threshold from the vehicle 3900. Thus, the system controller 3131 also functions as a target detecting unit.

Figure 21A:
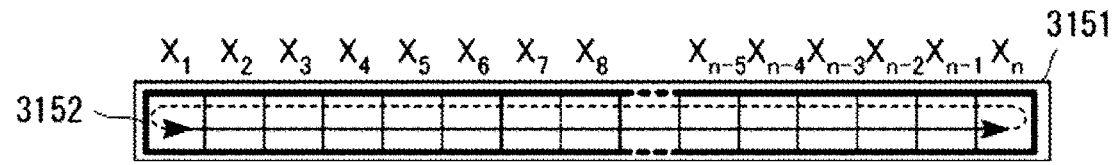
FIG. 21A is a conceptual diagram for explaining a ring buffer set in a memory card according to the sixth embodiment.
Figure 21B:
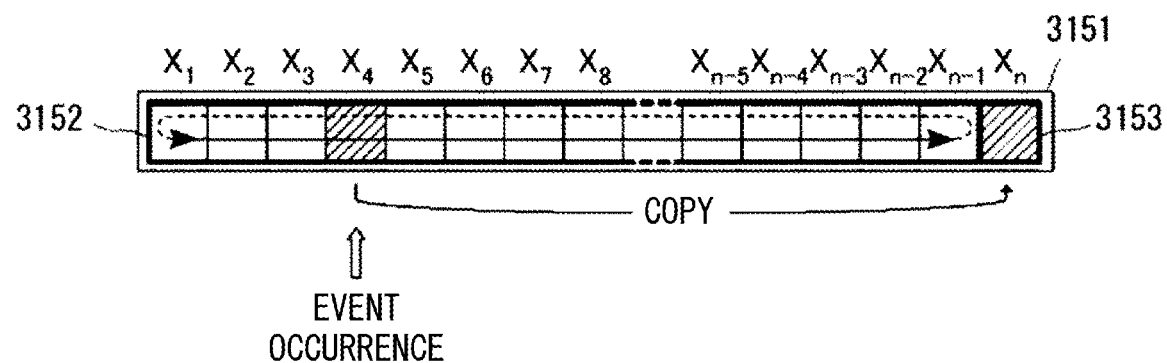
FIG. 21B is a conceptual diagram for explaining a ring buffer set in the memory card according to the sixth embodiment.
Figure 21C:
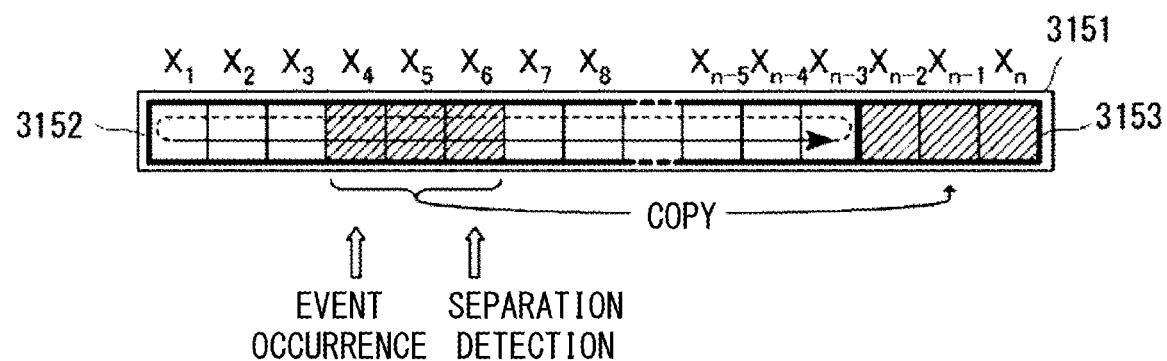
FIG. 21C is a conceptual diagram for explaining a ring buffer set in the memory card according to the sixth embodiment.

FIGS. 21A, 21B, and 21C are conceptual diagrams for explaining a ring buffer set in a memory card 3150. FIG. 21A is a conceptual diagram showing that all memory areas 3151 of the memory card 3150 are used as a ring buffer 3152. Detailed control by the memory controller 3137 in this case is similar to the control by the memory controller 1137 in FIG. 3A, and the description thereof is omitted. FIG. 21B is a conceptual diagram for explaining writing control in a conventional drive recorder. Detailed control by the memory controller 2137 in this case is similar to the control by the memory controller 1137 in FIG. 3B, and the description thereof is omitted.

Conventional drive recorders have been insufficient from the viewpoint of recording the state of a target after event occurrence. As shown in FIG. 21B, overwriting of moving image data, for example, for one minute including the event occurrence time is only prohibited. In the case of a collision, a target vehicle has already collided with the vehicle at the detection time, and only a part of the target vehicle usually appears in the image imaged at this time. The information obtained from the image is insufficient to identify the target vehicle.

For this reason, moving image data including a period from an event occurrence time until the system controller 3131 has detected that the positional relation of a target vehicle with the vehicle 3900 satisfies a predetermined condition is written in a memory so that the moving image data is not overwritten in the present embodiment. Specifically, moving image data including a period from an event occurrence time until a target is separated from the vehicle 3900 by a predetermined distance or more is copied in a non-volatile buffer 3153. FIG. 21C is a conceptual diagram for explaining writing control in the drive recorder 3100 according to the present embodiment. The methods for adding the non-volatile buffer 3153, for moving target moving image data, for recording in the ring buffer 3152, and the like are similar to those of the example in FIG. 21B, but a moving image file to be copied in the non-volatile buffer 3153 is different in the present embodiment.

It is assumed that a moving image file recorded in a memory area X4 of the ring buffer 3152 includes an event occurrence time in its imaging period similarly to the example in FIG. 21B. The camera unit 3110 continues imaging after the event, and the generated moving image files are successively written in X5, X6, and the like. The system controller 3131 monitors, based on a distance signal received via the input/output IF 3139, the distance to the target from the event occurrence time and detects that the target reaches a predetermined distance (separation detection). Here, it is assumed that the moving image file recorded in a memory area X6 includes a separation detection time in its imaging period.

In this case, the memory controller 3137 copies three moving image files of the moving image file in X4 including the event occurrence time, the moving image file in X5, and the moving image file in X6 including the separation detection time in the non-volatile buffer 3153 as event recording files. That is, the memory areas from Xn−2 to Xn are changed to the non-volatile buffer 3153, and the target moving image files are copied in the non-volatile buffer 3153. If different moving image files are recorded in the non-volatile buffer 3153, the non-volatile buffer 3153 is added so as to avoid the memory areas recording the moving image files.

Figure 22A:
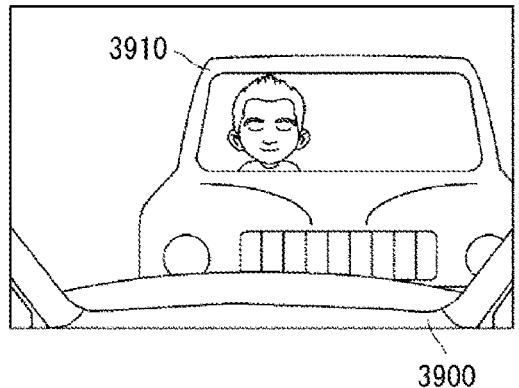
FIG. 22A is a schematic diagram showing a state immediately after an event occurs and a state in which another vehicle is separated according to the sixth embodiment.

When the period until the target is separated from the vehicle by a certain distance is kept so that overwriting of the images is prohibited in this manner, the image data is expected to include the entire image of the target. An example of this case is described. FIG. 22A shows the state immediately after another vehicle 3910 has collided with the vehicle 3900 (immediately after event occurrence), and FIG. 22B shows that the other vehicle 3910 is separated from the vehicle 3900 thereafter.

When a collision as shown in FIG. 22A occurs, the system controller 3131 recognizes that an event has occurred by receiving an acceleration signal greater than a threshold caused by the collision. The image imaged at this time has the range enclosed by the outside frame of FIG. 22A. That is, the other vehicle 3910 is too close to the vehicle 3900 that the entire other vehicle 3910 does not appear. Only with this image, it is impossible to attain objects of objectively recording the degree of damage due to the accident and of identifying the other vehicle 3910.

Figure 22B:
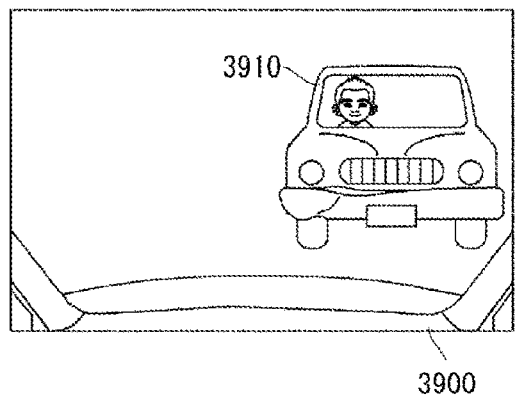
FIG. 22B is a schematic diagram showing a state immediately after the event occurs and a state in which the other vehicle is separated according to the sixth embodiment.

However, as long as an image as shown by the range enclosed by the outside frame of FIG. 22B is acquired when the vehicle 3900 is relatively separated from the other vehicle 3910 by a certain distance or more after the accident, it is possible to recognize the entire image or the number plate of the other vehicle 3910 after the accident and further attain the above objects. This greatly increases the utility value of the images. For example, if the other vehicle 3910 escapes thereafter, it is easy to identify the driver.

Figure 23:
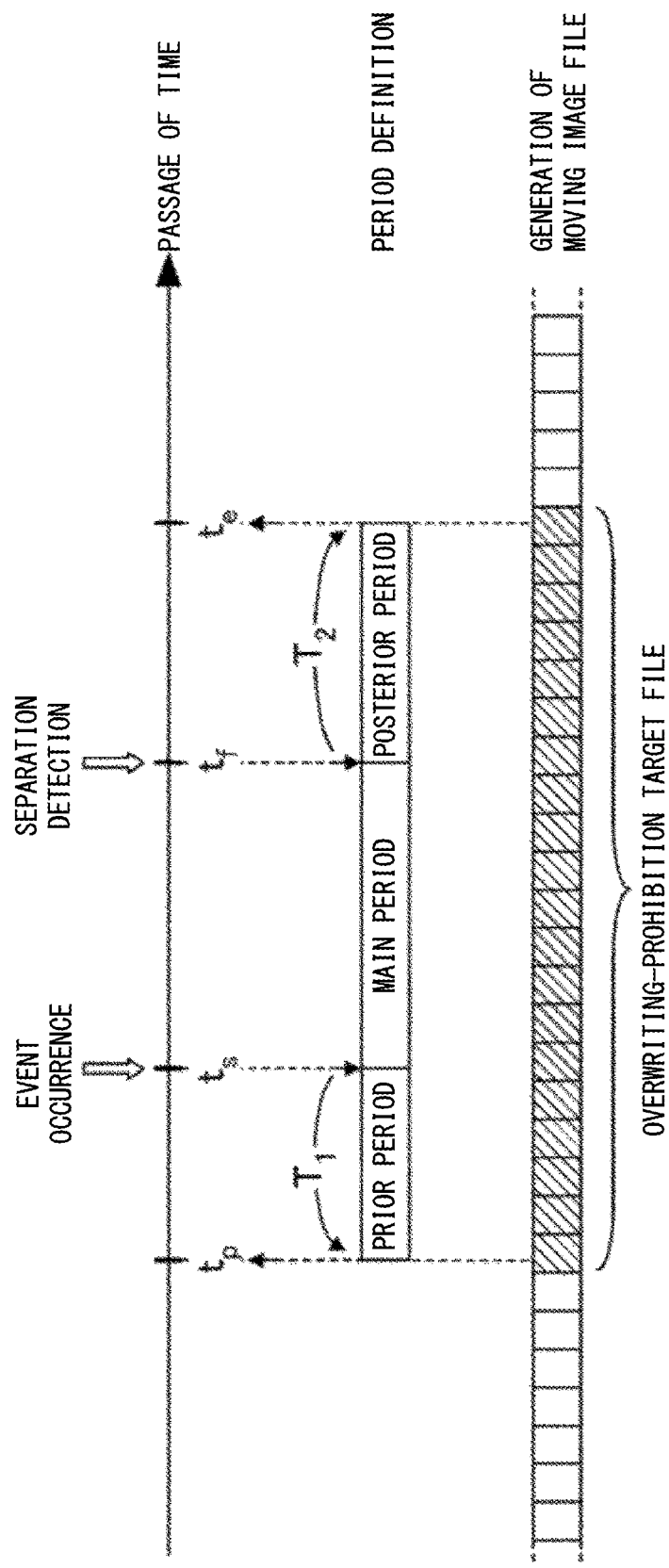
FIG. 23 is a diagram for explaining overwriting-prohibition target files over time according to the sixth embodiment.

As described above, when a moving image file including a period from an event occurrence time to a separation detection time is recorded so that the moving image file cannot be overwritten, the utility value of the moving image file after the accident is greatly increased. Furthermore, a storage period is added in the present embodiment. FIG. 23 is a diagram for explaining overwriting-prohibition target files over time according to the present embodiment. The drawing indicates the passage of time from the left to the right.

In the drawing, it is assumed that an event occurs at a time ts and that a target is detected to be separated at a time tf. The period from the time ts to the time tf is set as a main period. Then, by setting a time tp going back from the time ts by a predetermined fixed time T1 as a start time and the time ts as an end time, a prior period from the start time to the end time is set before the main period. In addition, by setting the time tf as a start time and a time to after a predetermined fixed time T2 passes from the time tf as an end time, a posterior period from the start time to the end time is set after the main period.

Then, the moving image files including these three periods are set as overwriting-prohibition target files which are event recording files. That is, these moving image files are copied in the non-volatile buffer 3153. In this manner, by adding the prior and posterior periods, it is expected to widen the usage range of the images. For example, the approaching other vehicle 3910 can appear in the moving image files in the prior period, which is used to specify the cause of the accident, to confirm that the other vehicle appearing in the moving image files in the main period is the accident cause, and the like. In addition, an approaching rescuer and the escaping other vehicle 3910 can appear in the moving image files in the posterior period, which is used to identify the persons who are involved in the accident, to pursue the criminal liability, and the like.

Figure 24:
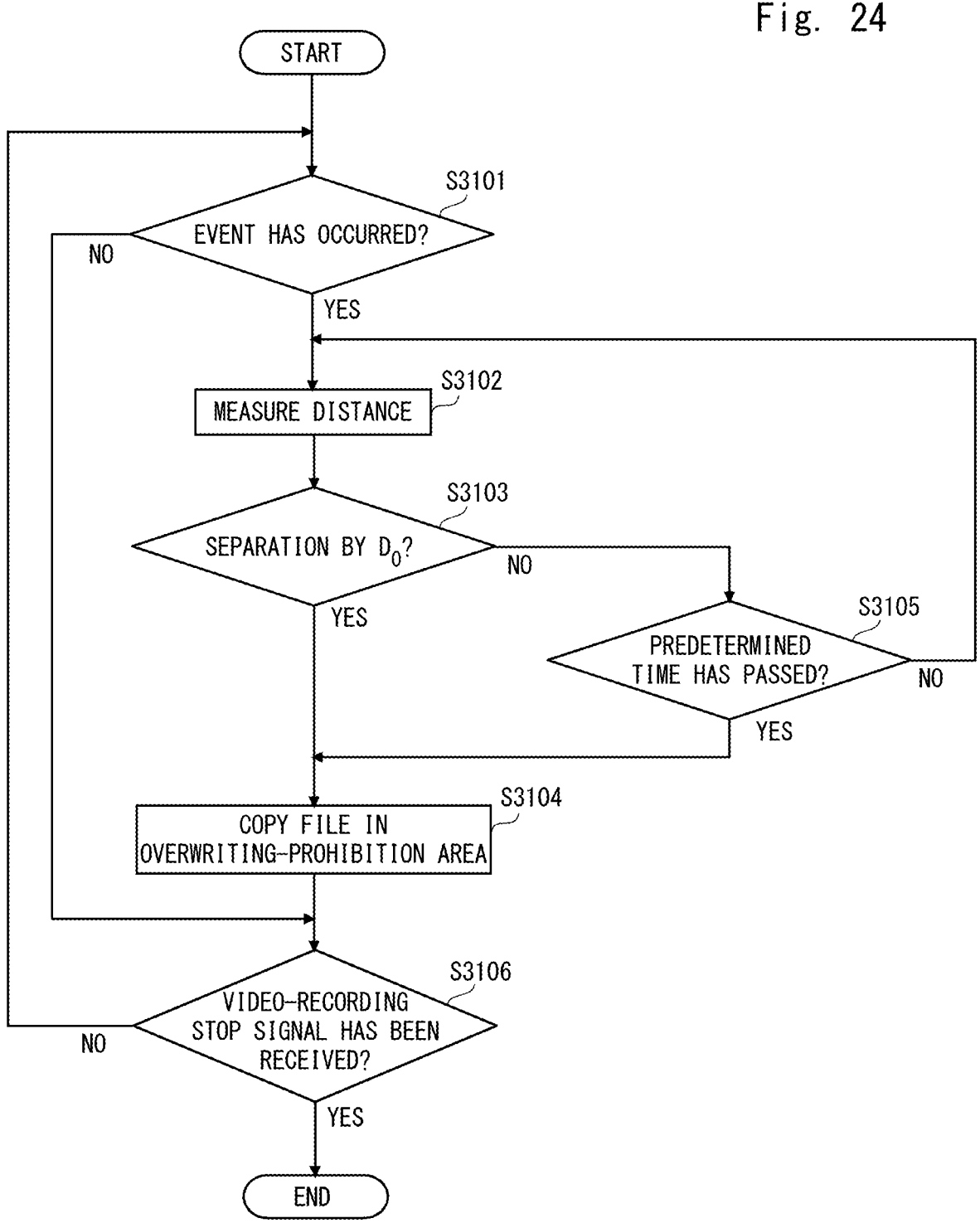
FIG. 24 is a flowchart showing a control procedure of the drive recorder according to the sixth embodiment.

Next, a control procedure of the drive recorder 3100 is described. FIG. 24 is a flowchart showing a control procedure of the drive recorder 3100. The procedure is started from when a traveling start preparation for the vehicle 3900 is completed. The completion of the traveling start preparation for the vehicle 3900 means, for example, starting the engine of the vehicle 3900, turning the power on, or the like. The drive recorder 3100 may operate at all times regardless of the state of the vehicle. The camera unit 3110 starts imaging as the procedure is started, and the image processing unit 3135 sequentially generates moving image files. Then, the memory controller 3137 successively records the moving image files in the memory card 3150 in the ring buffer format. The system controller 3131 monitors acceleration signals received from the acceleration sensor 3160. The following processing is performed during the control for recording the normal traveling.

The system controller 3131 determines, in step S3101, whether an acceleration signal greater than a threshold has been received from the acceleration sensor 3160, that is, whether an event has occurred. When determining that the acceleration signal greater than the threshold has been received, the system controller 3131 determines that an event has occurred and proceeds to step S3102. When determining that the acceleration signal greater than the threshold has not been received, the system controller 3131 proceeds to step S3106.

The system controller 3131 acquires, in step S3102, a distance signal from a distance sensor 3170. At this point, the system controller 3131 selectively acquires a distance signal from the distance sensor 3170 that detects the closest target among the multiple distance sensors 3170. Then, the system controller 3131 monitors change in the distance from the vehicle 3900 to the target.

The system controller 3131 determines, in step S3103, whether the target is separated from the vehicle 3900 by a predetermined distance $D_0$ (for example, 5 m). When determining that the target is separated by a predetermined distance $D_0$, the system controller 3131 proceeds to step S3104. When determining that the target is not separated, the system controller 3131 proceeds to step S3105.

The system controller 3131 determines, in step S3104, the main period and the accompanied prior period or the prior period and the posterior period as described with reference to FIG. 23. In response to this, the memory controller 3137 copies the moving image files corresponding to these periods in the non-volatile buffer 3153 which is an overwriting-prohibition area. That is, the system controller 3131 copies, as the processing in step S3104, the moving image files including the prior period and the main period in the non-volatile buffer 3153 which is an overwriting-prohibition area. Alternatively, the system controller 3131 copies, as the processing in step S3104, the moving image files including the prior period, the main period, and the posterior period in the non-volatile buffer 3153 which is an overwriting-prohibition area.

The system controller 3131 determines, in step S3106, whether a video-recording stop signal has been received. The video-recording stop signal is generated, for example, as the vehicle 3900 stops traveling or by a user operating a stop button. When determining that the video-recording stop signal has been received, the system controller 3131 causes the camera unit 3110 to stop imaging, stops recording the generated moving image files in the ring buffer format, and terminates a series of processing. When determining that the video-recording stop signal has not been received, the system controller 3131 returns to step S3101 to constitute a series of processing.

When the target has not been detected to be separated in step S3103 or when the target has not been separated by the predetermined distance $D_0$, the system controller 3131 copies the moving image files until a predetermined period has passed from the event occurrence in the non-volatile buffer 3153, which is an overwriting-prohibition area, and proceeds to step S3106. When, for example, the target has not been detected to be separated until three minutes has passed from the event occurrence or when the target has not been separated by the predetermined distance $D_0$, the system controller 3131 copies the moving image files until that point of time in the non-volatile buffer 3153, which is an overwriting-prohibition area, as event recording files. Specifically, when the target has not been detected to be separated in step S3103 or when the target has not been separated by the predetermined distance $D_0$, the system controller 3131 proceeds to step S3105 to determine whether a predetermined time has passed from the event occurrence. When determining that the predetermined time has not passed, the system controller 3131 returns to step S3102 to continue measuring the distance of the target. When determining that the predetermined time has passed, the system controller 3131 proceeds to step S3104.

Note that, when the target has not been detected to be separated in step S3103 or when the target has not been separated by the predetermined distance $D_0$, the system controller 3131 may copy the moving image files in the non-volatile buffer 3153 so that overwriting of the moving image files is prohibited until the storage capacity of the memory card 3150 reaches its limit. In addition, in the case of performing this record processing, the system controller 3131 may copy the moving image file corresponding to the section, in which the image has changed, in the non-volatile buffer 3153 which is an overwriting-prohibition area.

Specifically, when the target has not been detected to be separated in step S3103 or when the target has not been separated by the predetermined distance $D_0$, the system controller 3131 analyses whether the image has changed in the newest moving image file while continuing recording the generated moving image files. Specifically, the analysis is performed by comparing adjacent frame images to determine whether the images are matched. Then, when the images are matched in adjacent frames in all the frames, the system controller 3131 determines that the image has not changed in the moving image file. When only a part of a frame image is not matched, the system controller 3131 determines that the image has changed. Note that, when a part of an image area which is narrow relative to a frame image is changed, the system controller 3131 may determine that the image has not changed as a whole.

When determining that the image has not changed in the newest moving image file, the system controller 3131 causes the memory controller 3137 to erase, from the memory card 3150, the image file corresponding to the section in which the image has not changed. On the other hand, when determining that the image has changed, the system controller 3131 causes the memory controller 3137 to determine whether the ring buffer 3152 of the memory card 3150 has been exhausted, that is, whether the memory areas, of the ring buffer 3152, recording the moving image files generated before the event occurrence have been used up. When the memory controller 3137 determines that the memory areas have been used up, the system controller 3131 determines that there is no memory area for recording new moving image files and terminates a series of processing. At this time, the memory controller 3137 may change all the memory areas 3151 of the memory card 3150 to the non-volatile buffer 3153. On the other hand, when the memory controller 3137 determines that the memory areas have not been used up, the system controller 3131 returns to step S3102 to continue measuring the distance to the target.

By adding such processing, it is possible to continuously record the state after the event occurrence until the ring buffer 3152 is exhausted and to more effectively utilize the stored moving image files. In addition, by erasing the image files in which there is no change in the subject, it is possible to record the moving image files including a later period and to store the moving image files having a high utility value.

The sixth embodiment has been described above. Furthermore, an example in which a slight modification is made is described below. Similarly to the modified example in the first to third embodiments, another drive recorder and distance sensor can be installed at the rear of the vehicle (see FIG. 11). With the vehicle and the drive recorder configured in this manner, it is possible to handle a target colliding from a rear side.

In this case, by configuring the memory IF 3138 so as to load two memory cards 3150, it is possible to use one memory card 3150 for the front side, and the other memory card 3150 for the rear side. Naturally, the memory areas of one memory card 3150 may be divided and used for the front side and the rear side.

As long as the acceleration sensor 3160 further detects the direction of the detected acceleration, it is possible for the system controller 3131 to determine the direction in which the target has collided with the vehicle with the acceleration signal. When determining that the target has collided from a front side, the system controller 3131 performs the above writing control to be performed after event occurrence to the image data acquired from the camera unit 3110. On the other hand, when determining that the target has collided from a rear side, the system controller 3131 performs the above writing control to be performed after event occurrence to the image data acquired from a camera unit provided at the rear of the vehicle. That is, the system controller 3131 extracts direction information related to the occurrence direction in which the event has occurred to the vehicle from the acceleration signal and selects, based on the direction information, the distance sensor 3170 installed at the front of the vehicle or a distance sensor installed at the rear of the vehicle. Then, the system controller 3131 acquires the distance signal from the selected sensor and performs the above writing control. With the vehicle and the drive recorder configured in this manner, it is possible to more precisely record the target which has caused the event.

It has been described, as an example, that the memory areas 3151 are divided into the continuous ring buffer 3152 and the continuous non-volatile buffer 3153 in the above sixth embodiment. However, the ring buffer 3152 and the non-volatile buffer 3153 may not be physically continuous. Furthermore, it has been described that a part of the ring buffer 3152 is changed to the non-volatile buffer 3153 and a target moving image file is copied in the changed non-volatile buffer 3153 in the above embodiments. However, the writing control for prohibiting overwriting is not limited to this. For example, by setting a flag for prohibiting overwriting in a memory area recording a target moving image file, the area may be treated as the non-volatile buffer 3153. In this case, it is possible to omit the processing for copying the moving image file.

In addition, it has been described, as an example, that the memory areas 3151 of one memory card 3150 are divided into the ring buffer 3152 and the non-volatile buffer 3153 in the sixth embodiment. However, both the memory card 3150 used as the ring buffer 3152 and the memory card 3150 used as the non-volatile buffer 3153 may be loaded. Alternatively, a memory mounted in the main body unit 3130 may be used instead of the detachable memory card 3150. Furthermore, by implementing the memory IF 3138 as a wireless IF, the above writing control may be performed to a memory which is not physically adjacent.

In addition, it has been described that a moving image file, for example, for one minute is set as a unit for writing control in the sixth embodiment. However, the unit for writing control is not limited to one moving image file. For example, writing control may be performed in frame units. Furthermore, target image data is not limited to moving image data and may be, for example, still image data obtained by interval photographing.

When, for example, writing control is performed in frame units, by cutting out a file including a target period from the already generated moving image file, for example, for one minute to generate a new moving image file, and the new moving image file may be recorded in the non-volatile buffer as an event recording file. In this case, it is possible to store a moving image file in which the event occurrence time is set as a starting point. Naturally, when a prior period is added, a time going back from the starting point by a predetermined time is set as a start time of the prior period. By managing a starting point in this manner, it is possible to certainly store, regardless of a time recording moving image files at a normal time, a moving image file including, for example, 10 seconds before the event occurrence and 10 seconds after the event occurrence as an event recording file.

In addition, it has been described that the acceleration sensor 3160 is used as a sensor that detects event occurrence in the sixth embodiment. However, another sensor may be used. For example, a strain sensor that detects deformation caused by a collision of a target or a temperature sensor that detects an abnormal temperature may be used. Naturally, a plurality of sensors may be used in combination. Furthermore, sensors, such as the acceleration sensor 3160, may be incorporated in the drive recorder.

In addition, it has been described, as an example, that a distance signal is selectively acquired from the distance sensor 3170 that detects the closest target among the multiple distance sensors 3170 in the sixth embodiment. However, the method for selecting the distance sensor 3170 to acquires a distance signal is not limited to this. For example, in the example of an offset collision as shown in FIG. 22A or 22B, a certain distance sensor 3170 has already outputted a distance signal indicating an approach of the other vehicle 3910 in a period before the collision. By discriminating such a distance signal, it is possible for the system controller 3131 to determine that a distance signal from which distance sensor 3170 is to be acquired after the collision. In other words, the system controller 3131 is only required to acquire a distance signal indicating that the distance of an object approaching the vehicle 3900 has been detected as a target in a period in which no event signal has been acquired.

In addition, it has been described that the distance sensors 3170 are installed at the vehicle 3900 and the system controller 3131 acquires distance signals from the distance sensors 3170 in the sixth embodiment. However, by providing, for example, a compound eye to the camera unit 3110, a distance to a target may be calculated from a compound-eye image. In this case, the connection with the distance sensors 3170 can be omitted, and which makes the apparatus have a simpler configuration.

In addition, it has been described, as an example, that a target is the other vehicle 3910 in the sixth embodiment. However, a target may be a person or a fixed target fixed on a road surface. In either case, the image file recorded so as not to be overwritten is usable in inspections or the like of the accident.

What is claimed is:
1. An image recording apparatus comprising:
   an image-data acquiring unit configured to sequentially acquire image data comprising a plurality of image frames obtained by imaging a periphery of a vehicle;
   an event-signal acquiring unit configured to acquire an event signal indicating occurrence of a predetermined event to the vehicle;
   a condition detecting unit configured to, when the event-signal acquiring unit acquires the event signal:
      detect whether the obtained image data, which is acquired before the acquiring of the event signal, captured another vehicle approaching the vehicle, and
      detect, in the image data, whether a positional relation between the other vehicle and the vehicle satisfies a condition by determining an image frame of the obtained image data where the other vehicle is separated from the vehicle after acquiring the event signal; and
   a writing controller configured to write the obtained image data in a memory in a ring buffer format, or to write, when the event-signal acquiring unit acquires the event signal, the image data including a period from when the event signal has been acquired until the condition detecting unit has detected that the condition is satisfied in the memory such that the image data is not overwritten,
   wherein the condition detecting unit is configured to serve as a position detecting unit or a number-plate detecting unit, and
   wherein, in a case where the condition detecting unit is serving as a position detecting unit, the position detecting unit is configured to detect whether the positional relation between the other vehicle appearing in the image frame of the obtained image data and the vehicle satisfies a predetermined positional relation in the image frame and to detect, in response to detecting that the other vehicle satisfies the predetermined positional relation, that the condition is satisfied, wherein the predetermined positional relation is (i) a positional relation in which there is a road surface under the other vehicle in the image frame or (ii) a positional relation in which an entirety of the other vehicle is recognized in the image frame, and
   wherein, in a case where the condition detecting unit is serving as a number-plate detecting unit, the number-plate detecting unit is configured to detect a number plate from the image frame in the image data acquired by the image-data acquiring unit and to detect, in response to the detection of the number plate, that the condition is satisfied.

2. The image recording apparatus according to claim 1, wherein the writing controller is configured to further write in the memory, when the event-signal acquiring unit acquires the event signal, the image data including a period from when the position detecting unit has detected that the positional relation is satisfied until the position detecting unit has detected that a direction of the other vehicle in the image is changed such that the image data is not overwritten.

3. The image recording apparatus according to claim 1, wherein the writing controller is configured to further write in the memory, when the event-signal acquiring unit acquires the event signal, the image data including a period from when the position detecting unit has detected that the positional relation is satisfied until the position detecting unit has detected that the other vehicle becomes smaller than a predetermined size in the image such that the image data is not overwritten.

4. The image recording apparatus according to claim 1, further comprising an approaching-object detecting unit configured to detect an approaching object that approaches the vehicle in a period in which the event-signal acquiring unit does not acquire the event signal,
wherein the position detecting unit is configured to set the approaching object detected by the approaching-object detecting unit as the other vehicle.

5. The image recording apparatus according to claim 1, further comprising a position detecting unit configured to detect whether a target vehicle having the number plate detected by the number-plate detecting unit satisfies a predetermined positional relation in the image,
wherein the writing controller is configured to further write in the memory, when the event-signal acquiring unit acquires the event signal, the image data including a period from when the number-plate detecting unit has detected the number plate until the position detecting unit has detected that the positional relation is satisfied such that the image data is not overwritten.

6. The image recording apparatus according to claim 5, wherein the predetermined positional relation is a positional relation in which there is a road surface under the target vehicle in the image.

7. The image recording apparatus according to claim 5, wherein the predetermined positional relation is a direction of the target vehicle in the image.

8. The image recording apparatus according to claim 5, further comprising a target detecting unit configured to detect a target approaching the vehicle in a period in which the event-signal acquiring unit does not acquire the event signal,
wherein the number-plate detecting unit is configured to detect the number plate from an image area corresponding to the target detected by the target detecting unit.

9. The image recording apparatus according to claim 1, further comprising a distance-signal acquiring unit configured to acquire a distance signal indicating detection of a distance from the vehicle to a target near the vehicle,
wherein the condition detecting unit is configured to detect that the condition is satisfied when the distance-signal acquiring unit acquires the distance signal indicating that the target is separated from the vehicle by a predetermined distance or more.

10. The image recording apparatus according to claim 9, wherein
the event-signal acquiring unit configured to acquire the event signal containing direction information about an occurrence direction in which the event to the vehicle has occurred, and
the distance-signal acquiring unit configured to acquire the distance signal indicating detection of a direction to the target selected based on the direction information.

11. The image recording apparatus according to claim 9, wherein the distance-signal acquiring unit is configured to acquire the distance signal indicating detection of an object, as the target, that has approached the vehicle in a period in which the event signal is not acquired.

12. The image recording apparatus according to claim 1, wherein the writing controller is configured to further write in the memory, when the event-signal acquiring unit acquires the event signal, the image data including a period until a predetermined time passes from when the condition detecting unit has detected that the condition is satisfied such that the image data is not overwritten.

13. The image recording apparatus according to claim 1 wherein the writing controller is configured to terminate control to write the image data such that the image data is not overwritten when the event-signal acquiring unit acquires the event signal and when a writable memory area is used up before the condition detecting unit detects that the condition is satisfied.

14. The image recording apparatus according to claim 13, wherein the writing controller is configured to erase, when the image in the image data has not changed over a predetermined period, the image data in the period.

15. An image recording method comprising:
an image-data acquiring step of sequentially acquiring image data comprising a plurality of image frames obtained by imaging a periphery of a vehicle;
an event-signal acquiring step of acquiring an event signal indicating occurrence of a predetermined event to the vehicle;
a condition detecting step of:
detect whether the obtained image data, which is acquired before the acquiring of the event signal, captured another vehicle approaching the vehicle, and
detecting, in the image data, whether a condition is satisfied by determining an image frame of the obtained image data where the other vehicle is separated from the vehicle after acquiring the event signal; and
a writing controlling step of writing the obtained image data in a memory in a ring buffer format, or of writing, when the event signal is acquired in the event-signal acquiring step, the image data including a period from when the event signal has been acquired until the condition has been detected to be satisfied in the condition detecting step in the memory such that the image data is not overwritten,
wherein the condition detecting step serves as a position detecting step or a number-plate detecting step, and
wherein, in a case where the condition detecting step is a position detecting step, the position detecting step detects whether the positional relation between the other vehicle appearing in the image frame of the obtained image data and the vehicle satisfies a predetermined positional relation in the image frame and to detect, in response to detecting that the other vehicle satisfies the predetermined positional relation, that the condition is satisfied, wherein the predetermined positional relation is (i) a positional relation in which there is a road surface under the other vehicle in the image frame or (ii) a positional relation in which an entirety of the other vehicle is recognized in the image frame, and
wherein, in a case where the condition detecting unit is serving as a number-plate detecting step, the number-plate detecting step detects a number plate from the image frame in the image data acquired by the image-data acquiring unit and to detect, in response to the detection of the number plate, that the condition is satisfied.

16. A non-transitory computer readable medium storing an image recording program causing a computer to execute:
an image-data acquiring step of sequentially acquiring image data comprising a plurality of image frames obtained by imaging a periphery of a vehicle;
an event-signal acquiring step of acquiring an event signal indicating occurrence of a predetermined event to the vehicle;

a condition detecting step of:
- detect whether the obtained image data, which is acquired before the acquiring of the event signal, captured another vehicle approaching the vehicle, and
- detecting, in the image data, whether a predetermined condition is satisfied by determining an image frame of the obtained image data where the other vehicle is separated from the vehicle after acquiring the event signal; and a writing controlling step of writing the obtained image data in a memory in a ring buffer format, or of writing, when the event signal is acquired in the event-signal acquiring step, the image data including a period from when the event signal has been acquired until the condition has been detected to be satisfied in the condition detecting step in the memory such that the image data is not overwritten, wherein the condition detecting step serves as a position detecting step or a number-plate detecting step, and wherein, in a case where the condition detecting step is a position detecting step, the position detecting step detects whether the positional relation between the other vehicle appearing in the image frame of the obtained image data and the vehicle satisfies a predetermined positional relation in the image frame and to detect, in response to detecting that the other vehicle satisfies the predetermined positional relation, that the condition is satisfied, wherein the predetermined positional relation is (i) a positional relation in which there is a road surface under the other vehicle in the image frame or (ii) a positional relation in which an entirety of the other vehicle is recognized in the image frame, and wherein, in a case where the condition detecting step is a number-plate detecting step, the number-plate detecting step detects a number plate from the image frame in the image data acquired by the image-data acquiring unit and to detect, in response to the detection of the number plate, that the condition is satisfied.

* * * * *